(12) United States Patent
Nakai

(10) Patent No.: US 12,174,629 B2
(45) Date of Patent: Dec. 24, 2024

(54) INFORMATION PROCESSING APPARATUS, INFORMATION PROCESSING METHOD, PROGRAM, AND INFORMATION PROCESSING SYSTEM

(71) Applicant: Sony Group Corporation, Tokyo (JP)

(72) Inventor: Mikio Nakai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 433 days.

(21) Appl. No.: 17/607,414

(22) PCT Filed: Mar. 16, 2020

(86) PCT No.: PCT/JP2020/011395
§ 371 (c)(1),
(2) Date: Oct. 29, 2021

(87) PCT Pub. No.: WO2020/225979
PCT Pub. Date: Nov. 12, 2020

(65) Prior Publication Data
US 2022/0221857 A1    Jul. 14, 2022

(30) Foreign Application Priority Data
May 9, 2019 (JP) .................................. 2019-089144

(51) Int. Cl.
*G05D 1/00* (2024.01)
*B64U 20/87* (2023.01)
(Continued)

(52) U.S. Cl.
CPC .......... *G05D 1/0038* (2013.01); *B64U 20/87* (2023.01); *G05D 1/101* (2013.01); *G06T 7/70* (2017.01);
(Continued)

(58) Field of Classification Search
CPC ........ G05D 1/0038; G05D 1/101; G06T 7/70; G06T 2200/24; G06T 2207/30252;
(Continued)

(56) References Cited

U.S. PATENT DOCUMENTS

| 11,543,836 B2* | 1/2023 | Sugaya ............... G05D 1/0094 |
| 2015/0226575 A1 | 8/2015 | Rambo |
| 2020/0120170 A1* | 4/2020 | Amitay ................ G06Q 50/01 |

FOREIGN PATENT DOCUMENTS

| JP | 10-246632 A | 9/1998 |
| JP | 2001-141452 A | 5/2001 |

(Continued)

OTHER PUBLICATIONS

Joubert Niels et al : "An interactive tool for designing quadrotor camera shots", ACM Transactions on Graphics, ACM, NY, US, vol. 34, No. 6, Oct. 26, 2015 (Oct. 26, 2015), pp. 1-11, XP058516404,ISSN: 0730-0301, DOI: 10.1145/2816795.2818106* Section 4 ; figures 1, 2 *.

(Continued)

*Primary Examiner* — Tiffany P Young
(74) *Attorney, Agent, or Firm* — XSENSUS LLP

(57) ABSTRACT

An information processing apparatus according to an embodiment of the present technology includes an acquisition unit, an image generation unit, and a presentation unit. The acquisition unit acquires image data relating to a predetermined region on a map. The image generation unit generates a predicted image on the basis of the image data, the predicted image being predicted to be acquired when imaging is performed within the predetermined region. The presentation unit presents the predicted image on the basis of an instruction relating to generation of plan information relating to movement and imaging of a mobile body having an imaging function within the predetermined region.

19 Claims, 15 Drawing Sheets

(51) Int. Cl.
    *G06T 7/70*          (2017.01)
    *G06V 10/764*      (2022.01)
    *B64U 10/13*        (2023.01)
    *B64U 101/30*       (2023.01)

(52) U.S. Cl.
    CPC ............ *G06V 10/764* (2022.01); *B64U 10/13* (2023.01); *B64U 2101/30* (2023.01); *B64U 2201/10* (2023.01); *G06T 2200/24* (2013.01); *G06T 2207/30252* (2013.01)

(58) Field of Classification Search
    CPC .... G06V 10/764; B64C 39/024; B64D 47/08; B64U 2201/10; B64U 10/13; B64U 2101/30
    USPC ............................................................ 701/2
    See application file for complete search history.

(56) References Cited

FOREIGN PATENT DOCUMENTS

| | | |
|---|---|---|
| JP | 2006-133171 A | 5/2006 |
| JP | 2006246632 A | 9/2006 |
| JP | 2019-53500 A | 4/2019 |

OTHER PUBLICATIONS

International Search Report and Written Opinion mailed on Jun. 23, 2020, received for PCT Application PCT/JP2020/011395, Filed on Mar. 16, 2020, 8 pages including English Translation.

\* cited by examiner

| Landmark type | Distance from target | Imaging azimuth | Imaging altitude | Field angle position |
|---|---|---|---|---|
| Buildings | Distance 0 (directly above or directly below) 40%, 60%, 80%, 100%, 120%, 140% | East, west, south, north, and directly above | 10%, 50%, 100%, and 120% of height of landmark | Landmark is at center, right center, left center, upper center, upper right, upper left, lower center, lower right, or lower left of field angle. |
| Mountains | Distance 0 (directly above), 50%, 70%, 90% | East, west, south, north, and directly above | 10%, 50%, 100%, and 120% of height of landmark | Landmark is at center, right center, left center, upper center, upper right, upper left, lower center, lower right, or lower left of field angle. |
| ... | ... | ... | ... | ... |

FIG.12

INFORMATION PROCESSING APPARATUS, INFORMATION PROCESSING METHOD, PROGRAM, AND INFORMATION PROCESSING SYSTEM

CROSS-REFERENCE TO RELATED APPLICATIONS

The present application is based on PCT filing PCT/JP2020/011395, filed Mar. 16, 2020, which claims priority to JP 2019-089144, filed May 9, 2019, the entire contents of each are incorporated herein by reference.

TECHNICAL FIELD

The present technology relates to an information processing apparatus, an information processing method, a program, and an information processing system that are applicable to control of autonomous movement of a mobile body.

BACKGROUND ART

Patent Literature 1 discloses a technique for simulating a moving route of an aircraft or the like that performs aerial photogrammetry. In the simulation method described in Patent Literature 1, an imaging course for which an imaging condition such as a focal length and a threshold value regarding the size of an unphotographable region are set is input to a computer. When the size of a region within the set imaging course exceeds the threshold value, that region is determined to be an unphotographable region. Further, when the ratio of the determined unphotographable region occupying the imaging course is large, the imaging course is determined to be unsuitable for a simulation. As a result, an imaging course capable of capturing an effective aerial photograph is established by one imaging flight, which allows inexpensive and accurate aerial photogrammetry (paragraphs [0013] and [0028], FIGS. 1 and 3, and the like of Patent Literature 1).

CITATION LIST

Patent Literature

Patent Literature 1: Japanese Patent Application Laid-open No. 2001-141452

DISCLOSURE OF INVENTION

Technical Problem

As described above, there is a demand for a technique that makes it possible to generate plan information, which is obtained by predicting a captured image or video in advance before moving and by verifying such an image or video, for the movement and imaging of a mobile body having an imaging function.

In view of the above circumstances, it is an object of the present technology to provide an information processing apparatus, an information processing method, a program, and an information processing system that are capable of generating plan information for movement and imaging of a mobile body having an imaging function.

Solution to Problem

In order to achieve the above object, an information processing apparatus according to an embodiment of the present technology includes an acquisition unit, an image generation unit, and a presentation unit.

The acquisition unit acquires image data relating to a predetermined region on a map.

The image generation unit generates a predicted image on the basis of the image data, the predicted image being predicted to be acquired when imaging is performed within the predetermined region.

The presentation unit presents the predicted image on the basis of an instruction relating to generation of plan information relating to movement and imaging of a mobile body having an imaging function within the predetermined region.

In this information processing apparatus, the image data relating to the predetermined region on the map is acquired. The predicted image predicted to be acquired when imaging is performed within the predetermined region is generated on the basis of the image data. The predicted image is presented on the basis of the instruction relating to the generation of the plan information relating to the movement and imaging of the mobile body having an imaging function in the predetermined region. As a result, the plan information can be generated for the movement and imaging of the mobile body having the imaging function.

The presentation unit may output a graphical user interface (GUI) including the predicted image for inputting the instruction relating to the generation of the plan information.

The image generation unit may generate the predicted image on the basis of an instruction relating to at least one of a position within the predetermined region or an imaging condition.

The imaging condition may include at least one of an imaging direction, an imaging time, or environment information relating to the predetermined region.

The image generation unit may generate, on the basis of an instruction to select an object present within the predetermined region, the predicted image in which the object is imaged.

The image generation unit may generate the predicted image on the basis of a generation rule of the predicted image relating to the instruction to select the object.

The generation rule may include classification information for classifying the object and at least one of information of a relative imaging position relative to the object or information of a display state of the object within the predicted image, as information associated with the classification information.

The image generation unit may generate the predicted image by generating a prediction candidate image on the basis of position information of the object serving as a selection target and evaluating the prediction candidate image regarding a display state of the object within the predicted image.

The information processing apparatus may further include a plan generation unit that generates the plan information on the basis of an input instruction relating to the generation of the plan information.

The plan generation unit may generate the plan information on the basis of an instruction to select the presented predicted image.

The plan information may include at least one of a transit point, a moving time, or an imaging condition.

The image data may be image data acquired when a scanning mobile body having an imaging function performs imaging while scanning the predetermined region.

The image data may include omnidirectional image data.

The information processing apparatus may further include a control unit that controls an operation relating to the movement and the imaging of the mobile body having the imaging function on the basis of the plan information.

The information processing apparatus may further include a scanning generation unit that generates scanning plan information relating to scanning and imaging of the scanning mobile body within the predetermined region.

The scanning plan information may include cost information relating to a scanning route. In this case, the cost information may be generated on the basis of a scanning route that has been taken in a past.

An information processing method according to an embodiment of the present technology is an information processing method executed by a computer system, and includes: acquiring image data relating to a predetermined region on a map; generating a predicted image on the basis of the image data, the predicted image being predicted to be acquired when imaging is performed within the predetermined region; and presenting the predicted image on the basis of an instruction relating to generation of plan information relating to movement and imaging of a mobile body having an imaging function within the predetermined region.

A program according to an embodiment of the present technology causes a computer system to execute the steps of: acquiring image data relating to a predetermined region on a map; generating a predicted image on the basis of the image data, the predicted image being predicted to be acquired when imaging is performed within the predetermined region; and presenting the predicted image on the basis of an instruction relating to generation of plan information relating to movement and imaging of a mobile body having an imaging function within the predetermined region.

An information processing system according to an embodiment of the present technology includes an information processing apparatus and a mobile body.

The information processing apparatus includes an acquisition unit, an image generation unit, a presentation unit, a plan generation unit.

The acquisition unit acquires image data relating to a predetermined region on a map.

The image generation unit generates a predicted image on the basis of the image data, the predicted image being predicted to be acquired when imaging is performed within the predetermined region.

The presentation unit presents the predicted image on the basis of an instruction relating to generation of plan information relating to movement and imaging of a mobile body having an imaging function within the predetermined region.

The plan generation unit generates the plan information on the basis of an input instruction relating to the generation of the plan information.

The mobile body includes an imaging unit and performs imaging while moving within the predetermined region on the basis of the plan information generated by the information processing apparatus.

BRIEF DESCRIPTION OF DRAWINGS

FIG. 12 is a diagram showing an example of imaging rules.

MODE(S) FOR CARRYING OUT THE INVENTION

Embodiments according to the present technology will now be described below with reference to the drawings.

First Embodiment

[Drone Imaging System]

Figure 1:
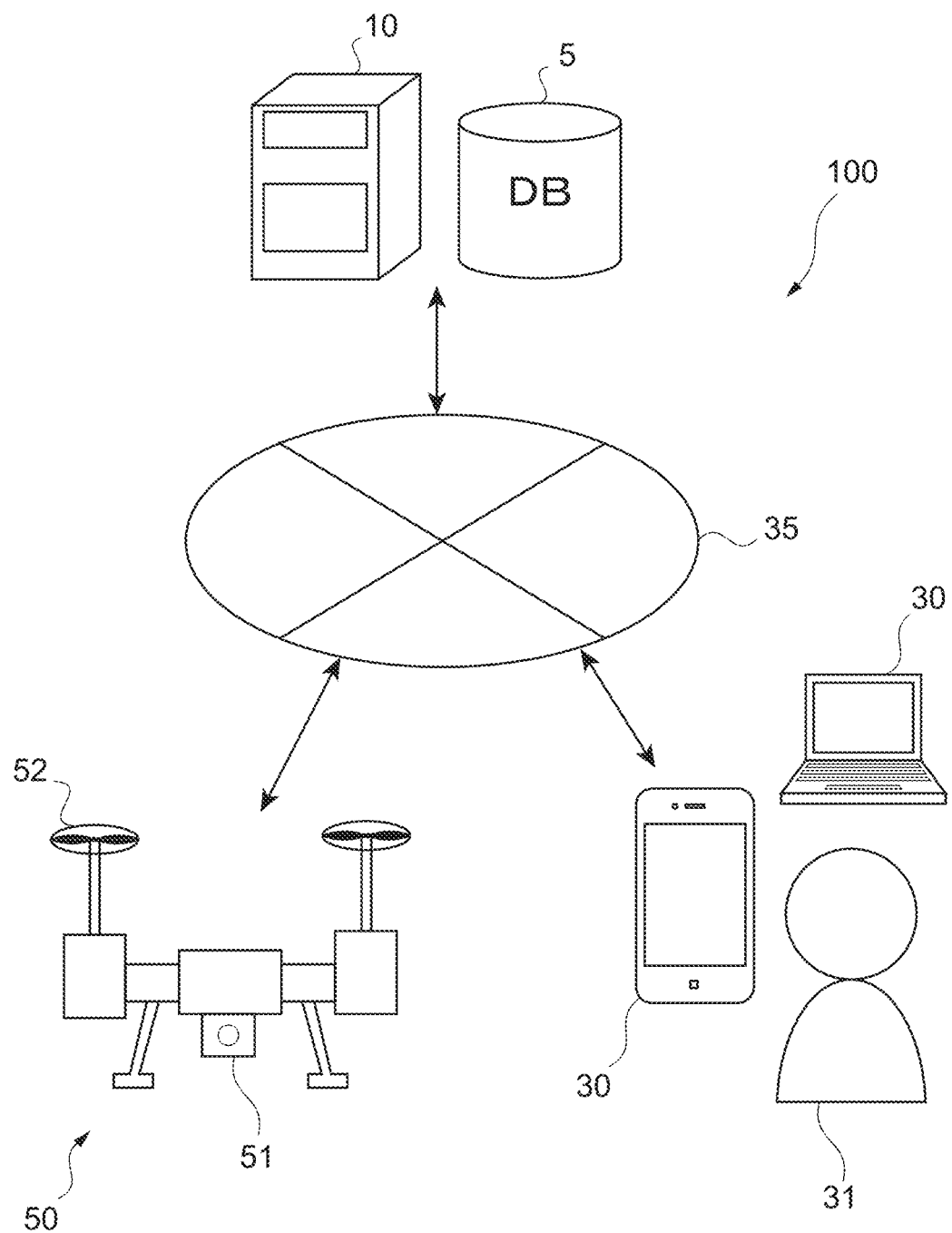
FIG. 1 is a schematic diagram showing a configuration example of a drone imaging system according to a first embodiment.

FIG. 1 is a schematic diagram showing a configuration example of a drone imaging system 100 according to a first embodiment of the present technology. A drone imaging system 100 corresponds to one embodiment of an information processing system according to the present technology.

The drone imaging system 100 includes a server apparatus 10, a user terminal 30, and a drone 50. The server apparatus 10, the user terminal 30, and the drone 50 are communicably connected to each other via a network 35.

The network 35 is constructed by, for example, the Internet or a wide area communication network. In addition, any wide area network (WAN), any local area network (LAN), or the like may be used, and a protocol for constructing the network 35 is not limited.

The server apparatus 10 is capable of providing an application service relating to the drone imaging system 100. In this embodiment, the server apparatus 10 generates plan information of the drone 50 on the basis of an instruction of a user 31. The plan information is plan information relating to the movement and imaging within a predetermined region on a map, and will be described later in detail. The server apparatus 10 serves as an embodiment of an information processing apparatus according to the present technology.

The server apparatus 10 includes a database 5 and allows the database 5 to store various types of information regarding the drone imaging system 100. The server apparatus 10 is also capable of reading various types of information from the database 5 and outputting them to the user terminal 30 or the like.

The user terminal 30 includes a variety of devices that can be used by the user 31. For example, a personal computer (PC), a smartphone, or the like is used as the user terminal 30. The user 31 can use the drone imaging system 100 via the user terminal 30.

The drone 50 is a mobile body including an autonomous movement control unit (not shown), an imaging device 51, and a drive system including a propeller 52. The autonomous movement control unit performs various types of control regarding the autonomous movement (autonomous flight) of the drone 50. For example, the autonomous movement control unit executes a self-position estimation, an analysis of a surrounding situation, an action plan using a cost map or the like, the control of the drive system, and the like.

The autonomous movement control unit is also capable of controlling an imaging operation by the imaging device 51. In this embodiment, the autonomous flight and automatic imaging of the drone 50 are executed on the basis of the plan information generated by the server apparatus 10. The configuration, method, and the like for implementing the autonomous flight and automatic imaging of the drone 50 are not limited, and any technique may be used.

As the imaging device 51, for example, a digital camera including an image sensor such as a complementary metal-oxide semiconductor (CMOS) sensor or a charge coupled device (CCD) sensor is used. In addition, for example, an infrared camera equipped with an infrared illumination such as an infrared LED may be used. In this embodiment, the drone 50 corresponds to a mobile body having an imaging function. Further, the imaging device 51 corresponds to an imaging unit.

Images captured by the imaging device 51 include both of still images and moving images (videos). In the present disclosure, the "image" is a concept including both of still images and moving images (videos).

In this embodiment, a so-called cloud service is provided by the network 35, the server apparatus 10, and the database 5. Thus, it can also be said that the user terminal 30 is connected to a cloud network.

Note that the method of communicably connecting the server apparatus 10 and the user terminal 30 to each other is not limited. For example, the server apparatus 10 and the user terminal 30 may be connected to each other using near field communication such as Bluetooth (registered trademark) without constructing a cloud network.

Figure 2:
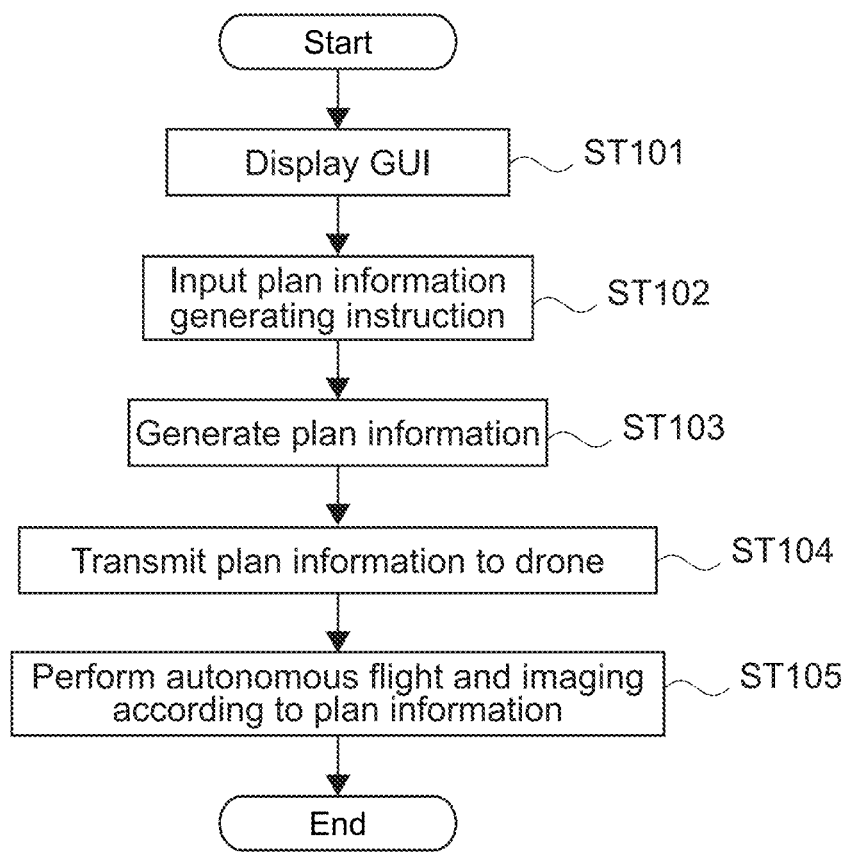
FIG. 2 is a flowchart showing the outline of an imaging example using the drone imaging system.

FIG. 2 is a flowchart showing the outline of an imaging example using the drone imaging system 100.

The user 31 uses the drone imaging system 100 to cause the drone 50 to image a desired scenery, a building, or the like. For example, an application program relating to the drone imaging system 100 is started by the user 31 via the user terminal 30.

A plan generating graphical user interface (GUI) for generating plan information is generated by the server apparatus 10 and transmitted to the user terminal 30. The transmitted plan generating GUI is displayed on the display of the user terminal 30 or the like (Step 101).

In the present disclosure, the plan information is plan information relating to the movement and imaging of a mobile body having an imaging function within a predetermined region. In this embodiment, the plan information corresponds to the plan information generated by the server apparatus 10 and relating to the movement and imaging within a predetermined region on a map. For example, the plan information includes various types of information about how to move the drone 50 and how to cause the drone 50 to perform imaging within a predetermined region.

Note that the predetermined region on the map is typically a region in which the user 31 flies the drone 50 to perform imaging, and is designated by the user 31.

The plan information includes, for example, a transit point (waypoint), a route, a travel time, imaging conditions, an airframe posture, and the like.

The transit point is a point through which the drone 50 passes, and is defined by latitude, longitude, or altitude, for example. The travel time includes a time taken for the drone 50 to pass through a transit point, a time taken to travel a route between transit points, and the like. Absolute time information may be set as the travel time. Alternatively, relative time information based on the timing at which the drone 50 starts flight may be set.

The imaging conditions include, for example, an imaging direction, an imaging time, and environment information relating to a predetermined region. The imaging direction corresponds to the direction of imaging by the imaging device 51 (imaging optical axis direction), and is defined by the direction of the imaging device 51 based on the airframe posture, for example. Therefore, the airframe posture can also be regarded as information included in the imaging conditions.

The environment information is information regarding the surrounding environment. For example, the environment information includes information such as weather, season, duration of sunshine, brightness, the position of the sun, and the position of the moon. For example, the user 31 can also generate plan information such as imaging of a sunset of a sunny day or a winter full moon.

A plan information generating instruction is input via the plan generating GUI displayed on the user terminal 30 (Step 102). In this embodiment, the plan information generating instruction input by the user 31 corresponds to an instruction relating to generation of plan information relating to movement and imaging of a mobile body having an imaging function within a predetermined region.

The server apparatus 10 generates plan information on the basis of the input plan information generating instruction (Step 103). The generated plan information is transmitted to the drone 50 (Step 104).

The drone 50 performs autonomous flight and automatic imaging according to the plan information generated by the server apparatus 10 (Step 105).

Further, the plan information includes scenario plan information and scanning plan information.

The scenario plan information is plan information relating to movement and imaging within a predetermined region on a map, which is specified after generation of a predicted image or a predicted moving image to be described later. In this embodiment, the drone 50 performs autonomous flight and imaging according to the scenario plan information transmitted from the server apparatus 10.

The scanning plan information is plan information generated on the basis of instruction information regarding a scanning range, which will be described later. For example, the scanning plan information includes the area (volume) and shape of the scanning range that the drone for scanning (hereinafter, referred to as scanning drone 60) scans, and the scanning setting for imaging during scanning or the like. The scanning drone 60 performs autonomous flight and imaging according to the transmitted scanning plan information.

Note that the processing from Step 101 to Step 105 described above is also performed for the generation of the scanning plan information transmitted to the scanning drone 60.

Figure 3:
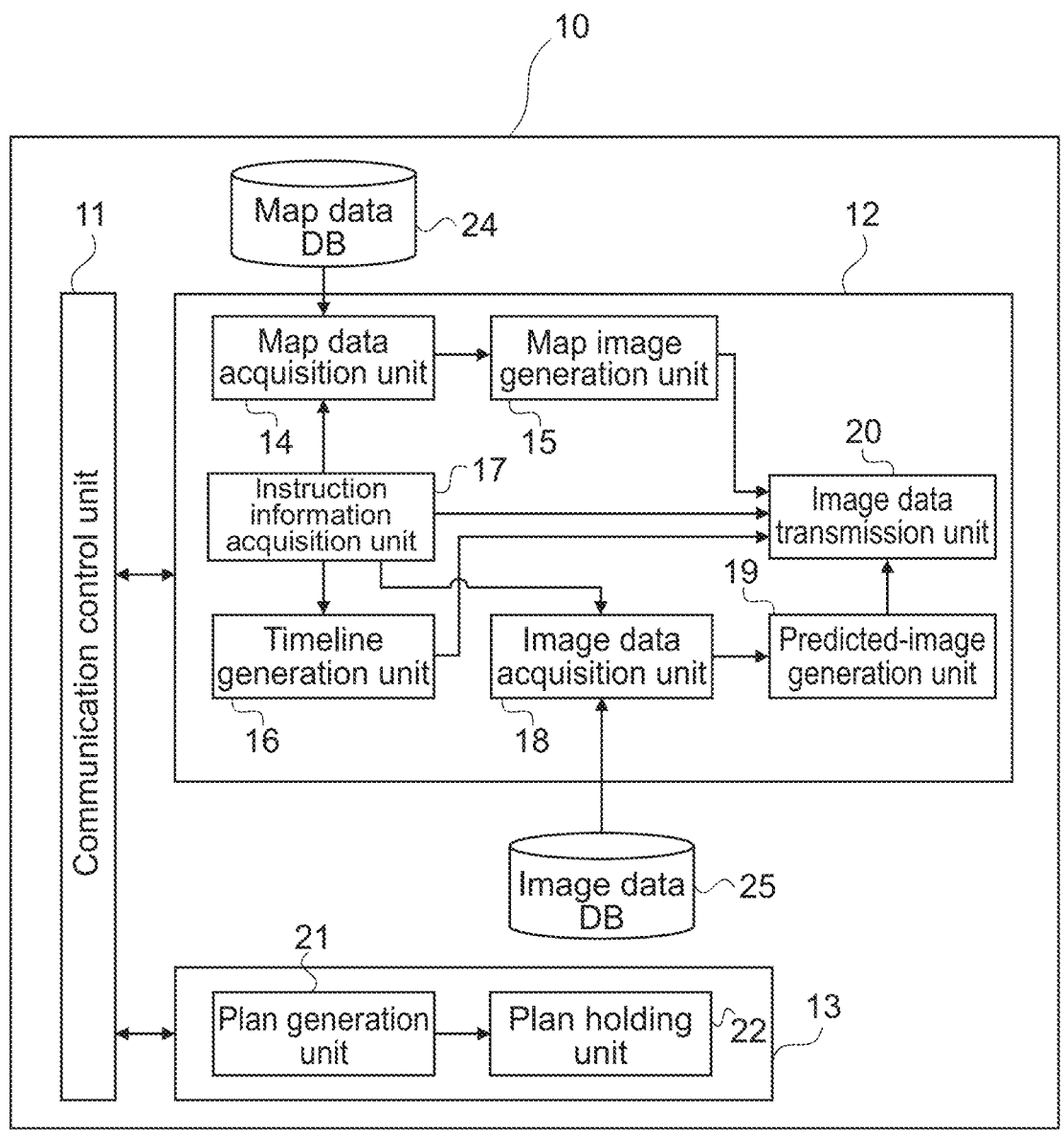
FIG. 3 is a block diagram showing a functional configuration example of a server apparatus.
Figure 4:
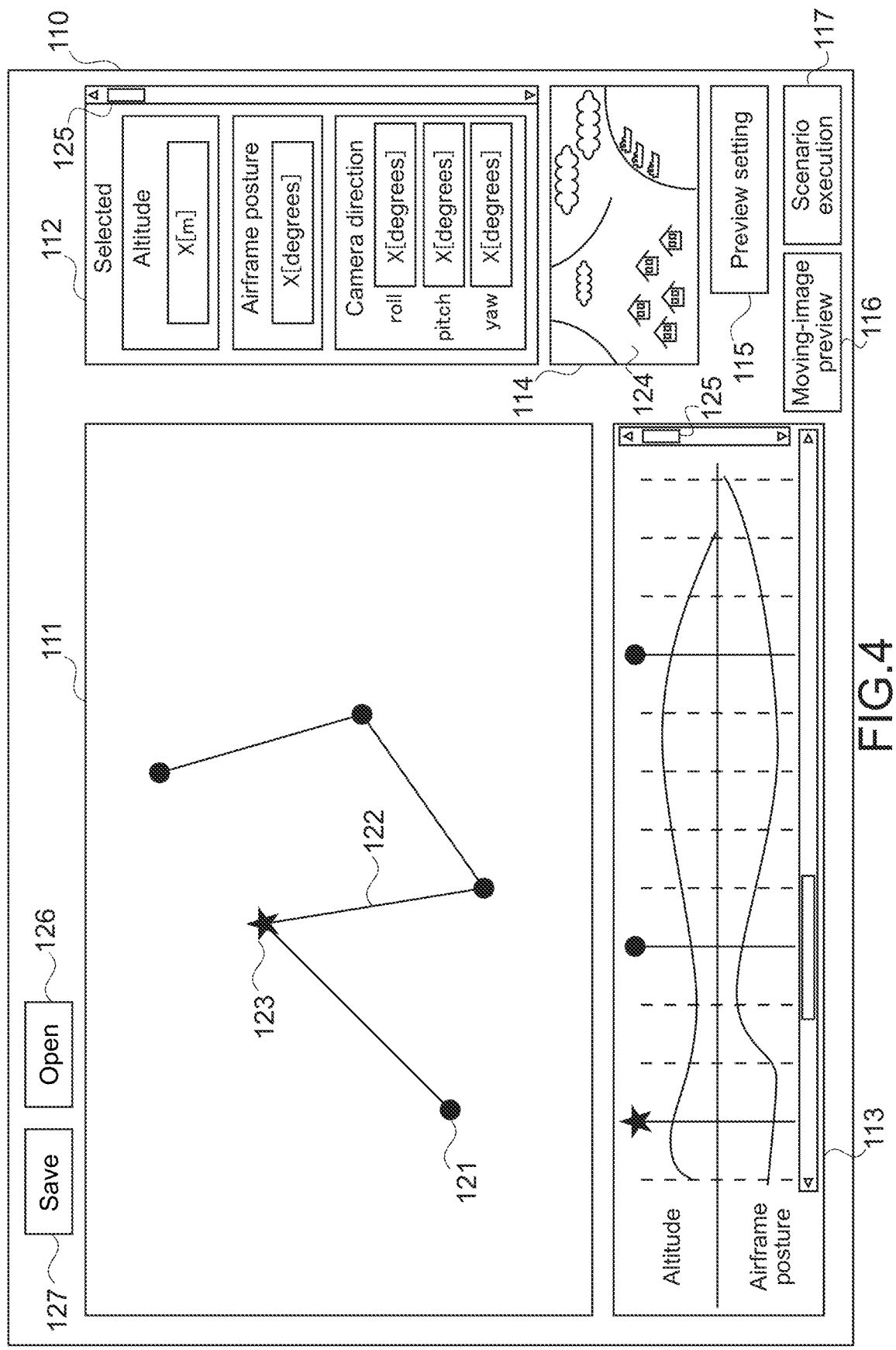
FIG. 4 is a schematic diagram showing an example of a plan generating GUI.

FIG. 3 is a block diagram showing a functional configuration example of the server apparatus 10 according to this embodiment. FIG. 4 is a schematic diagram showing an example of the plan generating GUI.

Figure 15:
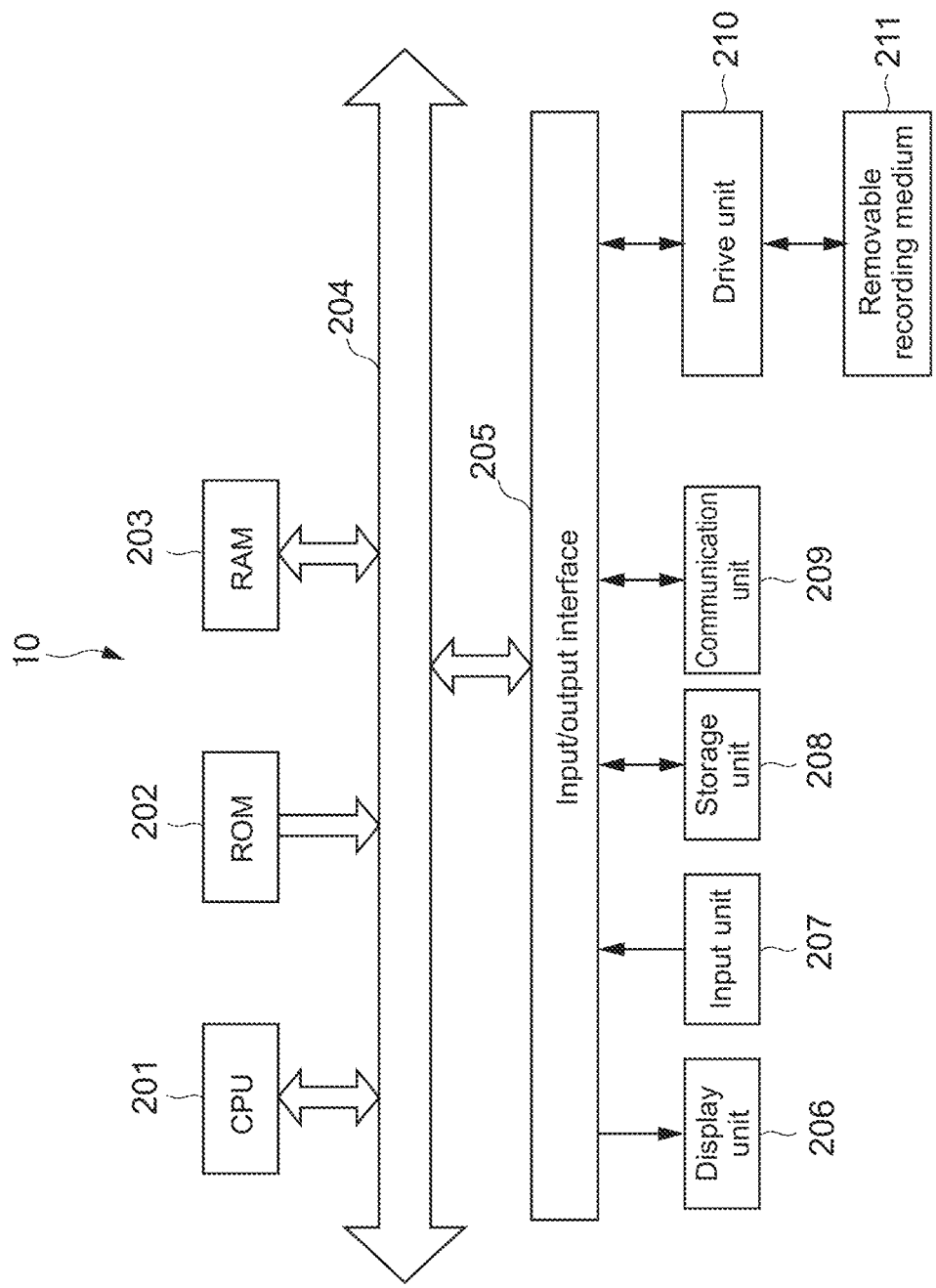
FIG. 15 is a block diagram showing a hardware configuration example of the server apparatus.

The server apparatus 10 includes hardware required for the configuration of a computer, such as a CPU, a ROM, a RAM, and an HDD (see FIG. 15). The CPU loads a program according to the present technology, which is recorded in advance in the ROM or the like, into the RAM and executes the program, so that each functional block illustrated in FIG. 3 is implemented, and an information processing method according to the present technology is executed.

For example, the server apparatus 10 can be implemented by any computer such as a PC. Of course, hardware such as a FPGA or ASIC may be used. Further, in order to implement each block illustrated in FIG. 3, dedicated hardware such as an integrated circuit (IC) may be used.

The program is installed in, for example, the server apparatus 10 via various recording media. Alternatively, the program may be installed via the Internet or the like.

As shown in FIG. 3, the server apparatus 10 includes a communication control unit 11, a GUI generation unit 12, and a scenario plan information generation unit 13.

The communication control unit 11 controls communication with the user terminal 30 and the drone 50. For example, the communication control unit 11 receives an instruction to generate scenario plan information input via the user terminal 30, and supplies the received instruction to the GUI generation unit 12 and the scenario plan information generation unit 13. Further, the scenario plan information generated by the scenario plan information generation unit 13 is transmitted to the drone 50.

In this embodiment, the communication control unit 11 functions as a control unit that controls the operation relating to the movement and imaging of the mobile body having an imaging function on the basis of the scenario plan information. In other words, the transmission of the scenario plan information to the drone 50 controls the autonomous flight and automatic imaging of the drone 50.

The present technology is not limited to the above, and the server apparatus 10 may remotely control the autonomous flight and automatic imaging of the drone 50 in real time. In this case, a block of remotely controlling the drone 50 functions as a control unit.

The GUI generation unit 12 includes a map data acquisition unit 14, a map image generation unit 15, a timeline generation unit 16, an instruction information acquisition unit 17, an image data acquisition unit 18, a predicted-image generation unit 19, and an image data transmission unit 20. Note that a map data DB 24 and an image data DB 25 are constructed in the database 5 shown in FIG. 1.

The blocks included in the GUI generation unit 12 cooperate with each other to generate a plan generating GUI 110 illustrated in FIG. 4.

In this embodiment, the plan generating GUI 110 includes a map display part 111, an imaging condition setting part 112, a timeline display part 113, a predicted-image display part 114, a preview setting button 115, a moving-image preview button 116, a scenario execution button 117, an open button 126, and a save button 127.

A map including buildings, roads, and the like is displayed in the map display part 111. Note that FIG. 4 shows transit points included in the scenario plan information and a route connecting the transit points, and omits the illustration relating to the map such as a road and a map. Note that a mode in which both a map and a transit point are displayed, a mode in which only a map is displayed, and a mode in which only a transit point is displayed may be switchable according to an instruction from the user 31.

The user 31 designates a map to be displayed in the map display part 111. For example, a map including a region desired to be imaged by the drone 50 is designated. The method of designating a map is not limited. For example, a map is displayed on the basis of input of an address, and a map including a region desired to be imaged is then displayed in the map display part 111 by a scroll operation, an enlargement/reduction operation, or the like.

Alternatively, the user 31 may designate a particular building, mountain, lake, etc. (hereinafter, referred to as a landmark). In response to an instruction to designate a particular landmark, the map including the landmark is displayed in the map display part 111. Of course, the present technology is not limited to those methods, and any other method may be employed.

In this embodiment, the landmark corresponds to an object present in a predetermined region. Further, the region desired to be imaged corresponds to a predetermined region on the map. Typically, the entire region displayed in the map display part 111 is set as a region desired to be imaged.

The instruction information acquisition unit 17 shown in FIG. 3 acquires instruction information relating to various instructions that are input from the user 31 via the plan generating GUI 110. The instruction relating to the display of the map in the map display part 111 (instruction information) is output to the map data acquisition unit 14.

The map data acquisition unit 14 acquires the map data from the map data DB 24 on the basis of the instruction information. For example, the map data DB 24 stores various types of map data. For example, landmark information and latitude and longitude information are stored in association with each other. This makes it possible to acquire map data including the landmark in response to the designation of the landmark.

On the basis of the map data acquired by the map data acquisition unit 14, the map image generation unit 15 generates image data of a map to be displayed in the map display part 111 of the plan generating GUI 110. For example, a display region, a magnification, the presence or absence of display of a landmark, and the like are appropriately set.

The image data generated by the map image generation unit 15 is transmitted to the user terminal 30 by the image data transmission unit 20. Thus, the map is displayed in the map display part 111 of the plan generating GUI 110. Further, the display of the map is updated appropriately in response to the user's operation of scrolling the map, for example.

Further, in this embodiment, as shown in FIG. 4, any point in the map displayed in the map display part 111 is selectable by the user 31. The selected point is set as a transit point 121 and is identifiably displayed. A plurality of transit points 121 is connected to each other to generate a moving route 122 of the drone 50.

As described above, in this embodiment, a position in the map (region desired to be imaged) can be indicated via the plan generating GUI 110.

The indication of the transit point 121 can be input by moving a pointer over the map and selecting a decision button. Alternatively, the latitude and longitude may be input. Alternatively, the transit point 121 can also be indicated by selecting a predetermined landmark on the map.

For example, if the Tokyo Tower is selected as the landmark, a point where the Tokyo Tower exists (a point of the latitude and longitude of the Tokyo Tower) is designated as the transit point 121. Of course, a point in the vicinity of the Tokyo Tower may be designated as the transit point 121 in response to the selection of the Tokyo Tower.

Further, the method of generating the moving route 122 of the drone 50 is not limited. For example, the transit points selected by the user 31 may be connected to each order in the selected order. Further, when the drone 50 fails to move in accordance with the moving route 122 displayed in the map display part 111 due to a building or the like, the fact that the moving route 122 cannot be generated may be displayed.

In this embodiment, the map image generation unit 15 generates image data including the transit point 121 and the moving route 122 on the basis of the instruction information to designate the transit point 121. Of course, an image of the transit point 121 and the moving route 122 may be generated and superimposed on the map by a block different from the map image generation unit 15.

The imaging condition setting part 112 shown in FIG. 4 is a GUI for setting the imaging conditions. In this embodiment, the imaging conditions are set for each transit point 121. In other words, it is possible to input an instruction relating to what kind of imaging is to be executed by the drone 50 that has reached the transit point 121. Of course, it is also possible to cause the drone 50 traveling along the moving route to perform imaging.

As shown in FIG. 4, in this embodiment, it is possible to input the altitude (m), the airframe posture (degrees), and the camera direction (roll angle, pitch angle, and yaw angle).

For example, the altitude can be set as the distance to the ground. The airframe posture can be set as an angle inclined as a yaw angle in a predetermined direction on the basis of a state of the drone 50 installed on the ground or a predetermined direction. Further, for example, for the camera direction, the roll angle, the pitch angle, and the yaw angle can be set with reference to the front direction of the drone 50. Note that the airframe posture and the coordinate system for defining the camera direction may be arbitrarily set. For example, the coordinate system is set on the basis of the installation state of the drone 50 before the flight. Of course, the present technology is not limited to the above. Further, the camera direction corresponds to the imaging direction.

It is also possible to designate other parameters by scrolling down the imaging condition setting part 112 illustrated in FIG. 4. For example, various imaging conditions and various parameters relating to autonomous flight, such as an imaging time, environment information, a movement speed, the time to start movement, and the time to end movement, can be set.

Note that a transit point 123 for which the imaging conditions are to be set is displayed so as to be distinguishable from other transit points. For example, in the example shown in FIG. 4, the transit point 123 for which the imaging conditions are to be set is displayed by a star mark. Of course, the present technology is not limited to such a display mode.

The predicted-image display part 114 displays a predicted image 124 that is predicted to be acquired when imaging is performed by the drone 50. The display of the predicted image 124 can also be referred to as preview display of an image that is predicted to be acquired when imaging is performed by the drone 50. Further, the predicted image 124 can also be referred to as a simulated image when the drone 50 performs imaging.

The instruction information acquisition unit 17 shown in FIG. 3 acquires the instruction information regarding the selection of the transit point 121 and the instruction information regarding the designation of the imaging conditions for each transit point 121, and outputs the instruction information to the image data acquisition unit 18.

On the basis of the instruction information, the image data acquisition unit 18 acquires image data relating to a predetermined region on a map from the image data DB 25. In this embodiment, the image data of a map (region desired to be imaged) designated by the user 31 is acquired. Note that in this embodiment the image data acquisition unit 18 corresponds to an acquisition unit that acquires image data relating to a predetermined region on a map.

The image data DB 25 stores image data relating to various regions and various landmarks on the map.

For example, the image data of an omnidirectional image, which is acquired when the drone including a 360-degree camera or the like performs imaging while scanning a region on the map, is stored. In other words, a scanning mobile body having an imaging function may perform imaging while scanning a predetermined region, and thus the image data may be acquired. Of course, captured image data other than the omnidirectional image data may be used.

Alternatively, a virtual image such as a 3D polygon may be used as the image data. For example, a virtual image in which a building, a landscape, or the like included in a predetermined region is viewed from any coordinates or altitude and in any direction may be held as the image data.

The method of acquiring the map data stored in the map data DB 24 shown in FIG. 3 and the image data stored in the image data DB 25, the data format thereof, or the like is not limited. For example, the map data and the image data may be acquired via the network 35.

In this embodiment, the image data corresponds to image data relating to a predetermined region on the map.

The predicted-image generation unit 19 generates a predicted image 124 on the basis of the image data acquired by the image data acquisition unit 18.

The predicted-image generation unit 19 generates a predicted image 124 on the basis of the transit point 123 and the imaging conditions included in the instruction information. For example, a predicted image that is predicted to be acquired when the drone 50 actually performs imaging is generated on the basis of the latitude, longitude, and altitude of the transit point 123 and the imaging direction.

In addition, the method of generating the predicted image 124 is not limited, and any method may be employed. For example, if there is an image captured from the transit point 123 by the scanning drone, the predicted image 124 is generated on the basis of such an image. For example, an image captured by the scanning drone may be used as the predicted image 124 as it is.

If the scanning drone does not perform imaging from the transit point 123 designated by the user 31, for example, the predicted image 124 can also be generated on the basis of a plurality of images captured from peripheral points. For example, the predicted image 124 can be generated from peripheral images by using a free-viewpoint video technique or the like. As a result, it is possible to generate a high-accuracy predicted image 124 and to generate high-quality plan information.

Alternatively, if the scanning drone does not perform imaging from the transit point 123 designated by the user 31, the predicted image 124 is generated on the basis of an image captured from the point closest to a transit point. In other words, an image that is included in the image data and would be closest is selected as the predicted image 124. This makes it possible to reduce the processing load and speed up the processing.

In addition, any machine learning algorithm using, for example, a deep neural network (DNN) may be used. For example, the use of artificial intelligence (AI) or the like for performing deep learning allows an improvement in the generation accuracy of the predicted image 124. Note that the machine learning may be similarly applied to various other techniques within the present disclosure.

The image data of the predicted image 124 generated by the predicted-image generation unit 19 is transmitted to the user terminal 30 by the image data transmission unit 20. Thus, the predicted image 124 is displayed in the predicted-image display part 114 of the plan generating GUI 110. In addition, the display of the predicted image 124 is appropriately updated in response to an instruction to switch the transit point 123, an instruction to change the imaging conditions, or the like, which is given by the user.

As described above, in this embodiment, the predicted image 124 is presented on the basis of an instruction relating to the generation of the scenario plan information relating to the movement and imaging of the mobile body having an imaging function within a predetermined region on the map. Specifically, the plan generating GUI including the predicted image 124 is output so as to input an instruction to generate the scenario plan information. In other words, the output of the plan generating GUI is included in the presentation of the predicted image 124.

In this embodiment, the GUI generation unit 12 corresponds to a presentation unit that presents a predicted image on the basis of an instruction relating to generation of plan information relating to the movement and imaging of a mobile body having an imaging function within a predetermined region. Further, the predicted-image generation unit 19 corresponds to an image generation unit that generates, on the basis of the image data, a predicted image predicted to be acquired when the imaging is performed in a predetermined region.

The timeline display part 113 displays changes of predetermined parameters along a time series from the start of flight to the end of flight of the drone 50. For example, the changes along a time series of the imaging conditions such as the altitude, the airframe posture, and the camera direction of the drone 50 are displayed as a timeline on the basis of a predetermined time unit. The timeline display part 113 also displays time information when the drone 50 reaches each transit point 121.

For the time information displayed in the timeline, absolute time information may be used, or relative time information based on the time at which the drone 50 starts autonomous flight according to the scenario plan information may be displayed.

As shown in FIG. 4, by scrolling the timeline display part 113 in the horizontal direction, it is possible to confirm the imaging conditions in a desired time zone. Further, by scrolling the timeline display part 113 in the vertical direction, it is possible to confirm changes of various parameters along a time series.

The instruction information acquisition unit 17 shown in FIG. 3 acquires the instruction information regarding the selection of the transit point 123 and the instruction information regarding the designation of the imaging conditions for each transit point 123, and outputs the instruction information to the timeline generation unit 16.

The timeline generation unit 16 generates image data of the timeline on the basis of the instruction information.

The image data of the timeline generated by the timeline generation unit 16 is transmitted to the user terminal 30 by the image data transmission unit 20. Thus, the timeline is displayed in the timeline display part 113 of the plan generating GUI 110. In addition, the display of the timeline is appropriately updated in response to an instruction to switch the transit point 123, an instruction to change the imaging conditions, or the like, which is given by the user 31.

The preview setting button 115 is a button for performing various settings relating to the display (preview display) of the predicted image displayed in the predicted-image display part 114. When the preview setting button 115 is selected by the user 31, a predetermined screen opens, and various settings relating to the predicted image 124 can be changed.

Examples of the display settings of the predicted image include the settings of the accuracy of the predicted image 124, the processing of the predicted image, and frames per second (FPS) of the moving image displayed as the predicted image.

As for the accuracy of the predicted image, for example, a high-accuracy mode in which the predicted image 124 has high accuracy and a low-accuracy mode in which the predicted image 124 has low accuracy can be set to be switchable.

For example, it is possible to generate the predicted image 124 with very high accuracy by executing the above-mentioned free-viewpoint video technique, machine learning, or the like. On the other hand, it is possible to display the predicted image 124 with a low processing load and at high speed, though the accuracy is reduced, by selecting an image captured from a point closest to the transit point 123 as the predicted image 124.

For example, if the high-accuracy mode is set, a time lag may occur in the display of the predicted image 124. Thus, the two modes in which the accuracy of the predicted images 124 differs are configured to be switchable on the plan generating GUI 110, so that the operability can be improved.

As for the processing of the predicted image, in this embodiment, the predicted image is processed by the predicted-image generation unit 19 illustrated in FIG. 3 on the basis of at least one of the imaging direction, the imaging time, or the environment information relating to a predetermined region when the drone 50 performs imaging.

For example, the predicted image is subjected to image processing filter on the basis of time-varying elements such as the sun, the moon, brightness, and weather. For example, when the brightness is low (nighttime, cloudiness, etc.) among the time zones imaged by the drone 50, image processing is performed such that the brightness of the predicted image is reduced. Note that the time-varying elements such as the sun, the month, brightness, and weather are information included in the environment information regarding the imaging environment.

Note that the type of the image processing filter or the like is not limited. For example, it may be designated by the user on the plan generating GUI 110. In addition, for the weather or the like, the latitude, the longitude, and the time may be acquired from a web service or the like. Further, the method of processing the predicted image is not limited, and machine learning or the like may be used. Further, the processing also includes temporally connecting a plurality of predicted images to form a moving image on the basis of an instruction from the user 31.

As for the setting of the FPS of the moving image, if the predicted image is displayed as a moving image, any frame rate can be selected by the user 31. For example, when it is desired to reduce the amount of data, it is possible to perform a setting for decreasing the frame rate.

The moving-image preview button 116 is a button for displaying the predicted image 124, which is displayed in the predicted-image display part 114, as a moving image (a predicted image displayed as a moving image may be referred to as a predicted moving image).

When the user 31 selects the moving-image preview button 116, a predicted moving image is displayed on the basis of the moving route and the imaging conditions set by the user 31. For example, when the imaging conditions at each point of the drone 50 moving in the moving route 122 are set, a predicted image of each point of the drone 50 is generated. The generated predicted images are arranged in the imaging order, so that a predicted moving image is generated.

Of course, in the case where an instruction to capture a moving image is input at each transit point, the predicted images 124 at respective transit points may be continuously synthesized and displayed as a predicted moving image.

The scenario execution button 117 is a button for causing the drone 50 to execute the moving route and the imaging conditions set by the user 31. When the scenario execution button 117 is selected, the scenario plan information input so far is determined.

In other words, the plan information regarding the movement and imaging of the drone 50 within a predetermined region on the map, which is specified after the generation of the predicted image 124 or the predicted moving image, is determined.

The plan generating GUI 110 also includes the save button 127 capable of storing the generated scenario plan information and the open button 126 capable of displaying the saved scenario plan information. This makes it possible to save and redisplay the scenario plan information in the process of generation, for example.

A plan generation unit 21 shown in FIG. 3 generates scenario plan information in response to the selection of the scenario execution button 117. The generated scenario plan information is held by a plan holding unit 22 and stored in the database 5. Note that the number of pieces of scenario plan information to be held, a saving period, and the like are not limited.

When the open button 126 shown in FIG. 4 is selected, the scenario plan information is read from the database 5 and transmitted to the user terminal 30. Subsequently, for example, the scenario plan information in the process of generation is expanded to the user terminal 30.

Figure 5:
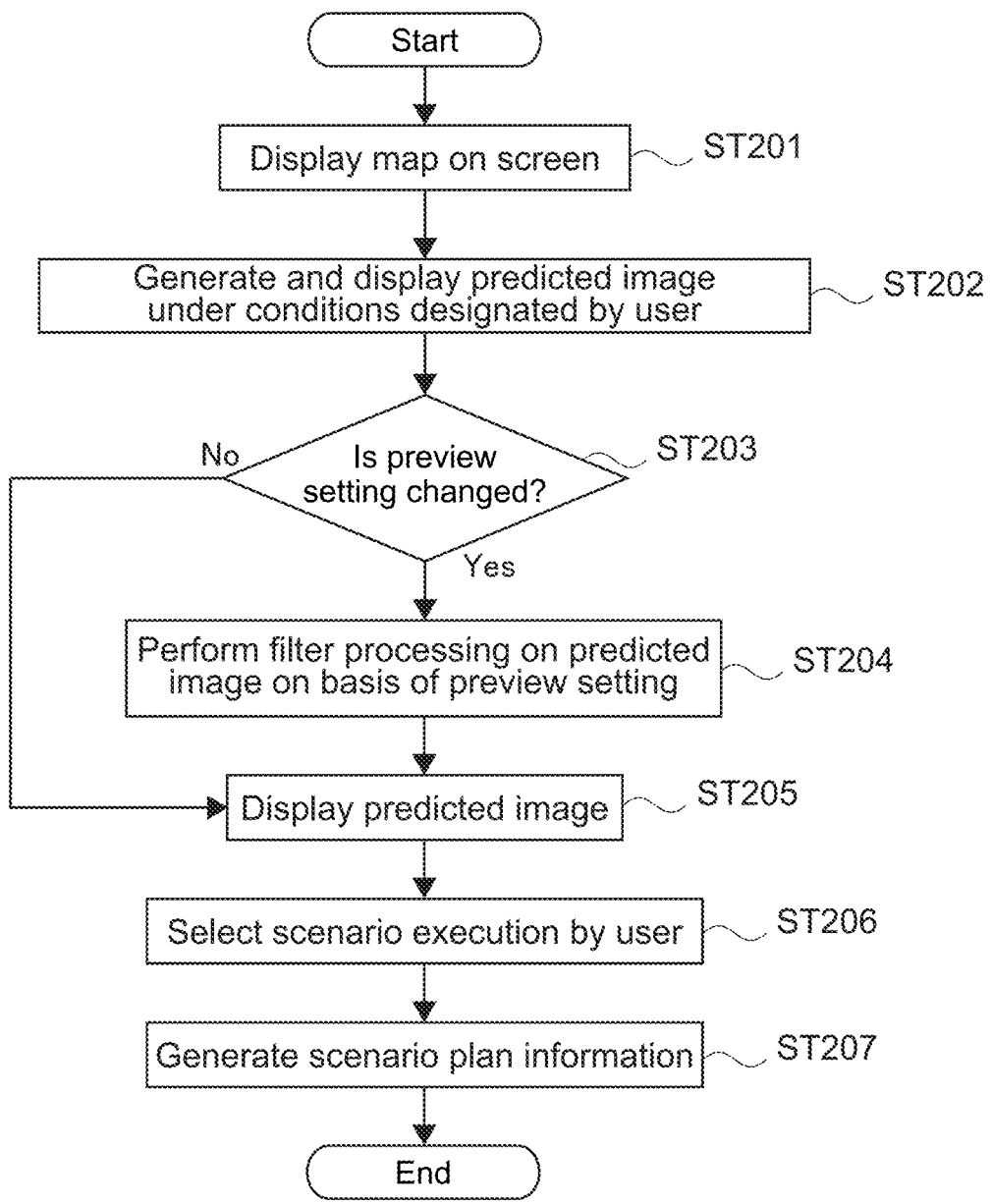
FIG. 5 is a flowchart showing a specific example of processing for generating the scenario plan information.

FIG. 5 is a flowchart showing a specific example of processing for generating the scenario plan information.

The map designated by the user 31 is displayed in the map display part 111 of the plan generating GUI 110 (Step 201). The user 31 selects any point from the map displayed in the map display part 111. Further, the user 31 sets the imaging conditions regarding each selected point via the imaging condition setting part 112.

A predicted image is generated on the basis of the imaging conditions of each transit point designated by the user 31. As a result, a predicted image based on the scenario plan information set by the user 31 is displayed in the predicted-image display part 114 (Step 202).

If the user 31 changes the display setting of the predicted image by the preview setting button 115 (YES in Step 203), the predicted image is processed on the basis of the display setting of the predicted image (Step 204). In other words, if the user 31 selects the preview setting button 115 and changes the setting, the processed predicted image 124 is displayed in the predicted-image display part 114.

If the user 31 changes the setting of the predicted image 124 by the preview setting button 115, the processed predicted image 124 is displayed by the preview setting button 115 (Step 205). Of course, if the setting of the predicted image 124 is not changed (NO in Step 203), the display state of the predicted image is maintained. If the user 31 selects the scenario execution button 117 (Step 206), the plan generation unit 21 generates the scenario plan information (Step 207).

Figure 6:
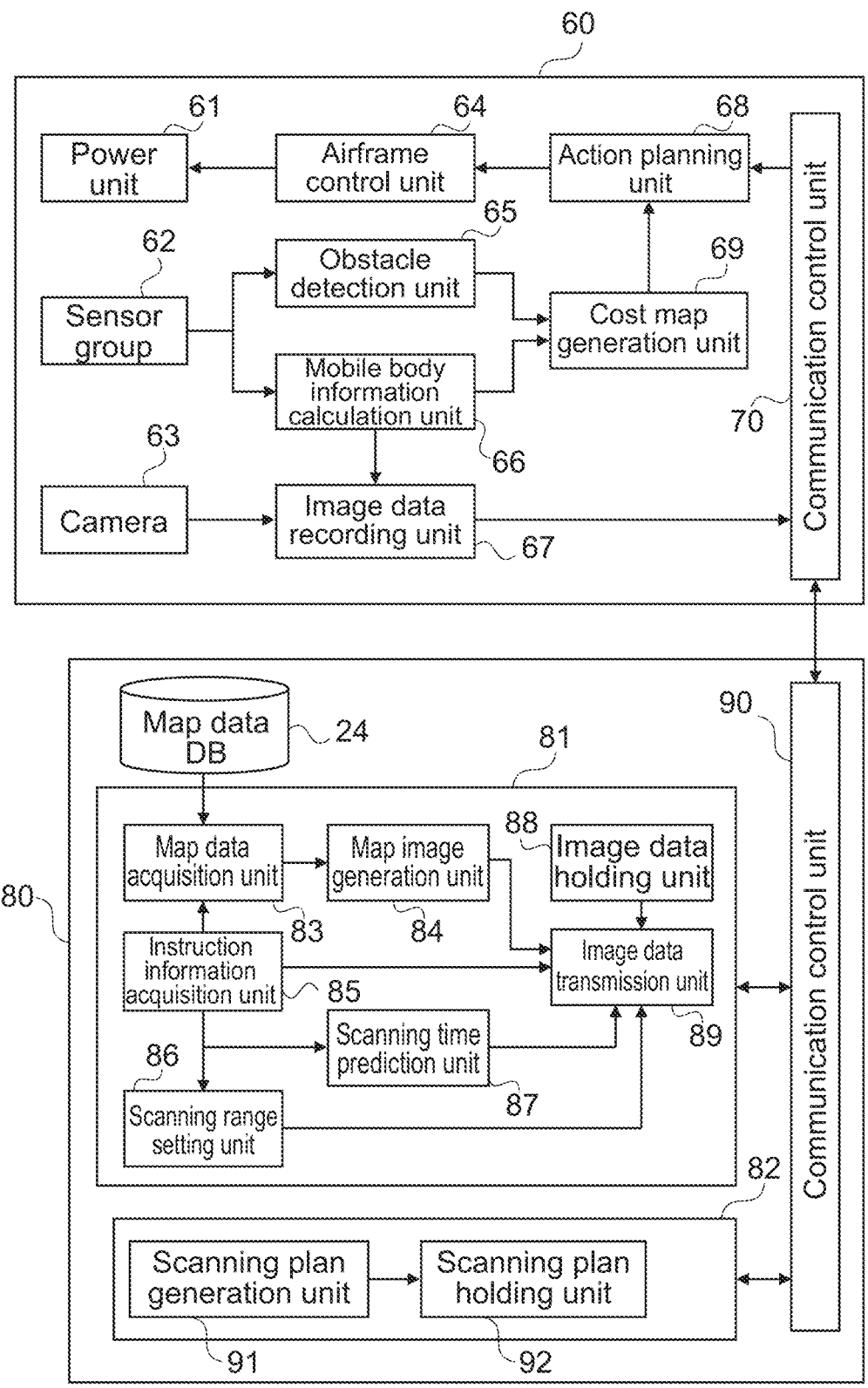
FIG. 6 is a block diagram showing functional configuration examples of a scanning drone and the server apparatus.
Figure 7:
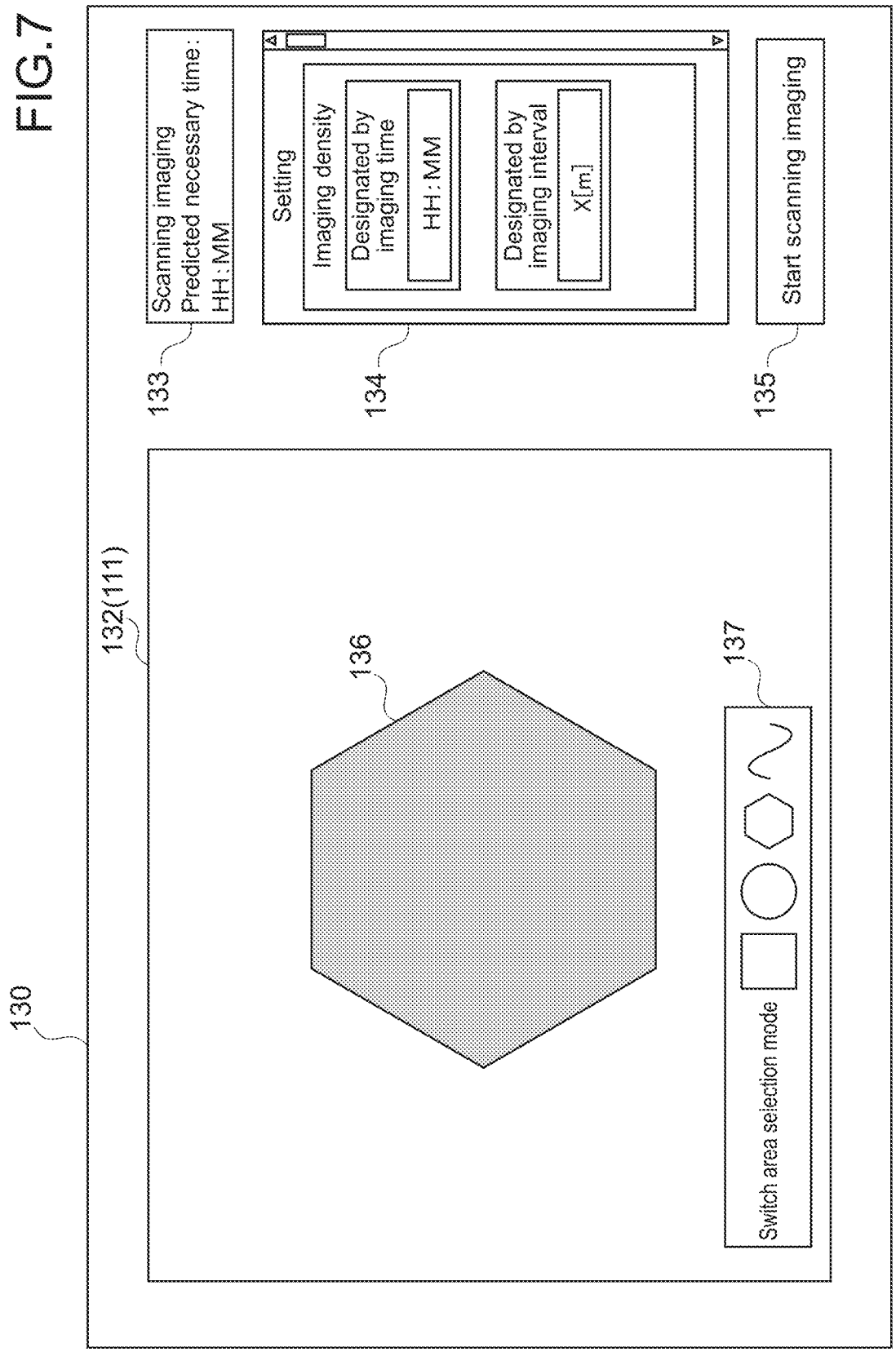
FIG. 7 is a schematic diagram showing a scanning plan generating GUI for executing the scanning of the scanning drone.

FIG. 6 is a block diagram showing a functional configuration examples of the scanning drone 60 and a server apparatus 80. FIG. 7 is a schematic diagram showing a scanning plan generating GUI 130 for executing scanning of the scanning drone 60. Note that in this embodiment the scanning drone 60 corresponds to a mobile body for scanning having an imaging function.

The scanning drone 60 includes a power unit 61, a sensor group 62, a camera 63, an airframe control unit 64, an obstacle detection unit 65, a mobile body information calculation unit 66, an image data recording unit 67, an action planning unit 68, a cost map generation unit 69, and a communication control unit 70.

The power unit 61 includes various devices relating to a drive system for moving the scanning drone 60. For example, the power unit 61 includes a servo motor capable of specifying torque, a motion controller that decomposes and replaces the motion of the movement of the scanning drone 60, and a feedback controller by a sensor in each motor.

For example, the power unit 61 also includes a motor including four to six propellers facing upward of the airframe, and a motion controller that decomposes and replaces the motion of the movement of the scanning drone 60 to and with the rotation amount of each motor.

The sensor group 62 includes various sensors for detecting external and internal information of the scanning drone 60 and the self-position of the scanning drone 60. Specifically, for example, the sensor group 62 includes a global positioning system (GPS) for detecting the self-position, a magnetic sensor for measuring the posture of the scanning drone 60, an inertial measuring device (IMU), and the like.

For example, the sensor group 62 includes a laser ranging sensor for detecting an obstacle or the like, a contact sensor, an ultrasonic sensor, a radar, LiDAR (Light Detection and Ranging, Laser Imaging Detection and Ranging), a barometer for measuring the atmospheric pressure, and the like.

The camera 63 images the periphery of the scanning drone 60 and acquires image data. In this embodiment, the camera 63 is an omnidirectional camera capable of simultaneously imaging at 360 degrees around, and captures an image within a region designated by the user 31. In other words, in this embodiment, the image data is an omnidirectional image. However, the image data may be a general planar image.

Note that the type of the camera 63 is not limited. For example, a digital camera including an image sensor such as a CMOS sensor or a CCD sensor may be used. The camera 63 may function as the sensor group 62. For example, in addition to a camera capable of simultaneously imaging at 360 degrees around, a stereo camera or the like for detecting an obstacle may function as the sensor group 62.

The airframe control unit 64 performs control of the operation of the scanning drone 60 on the basis of the action plan supplied from the action planning unit 68. For example, when the power unit 61 operates on the basis of the control signal, the scanning drone 60 is moved. In this embodiment, the power unit 61 (airframe control unit 64) implements a moving mechanism capable of moving in a predetermined region.

The obstacle detection unit 65 detects an obstacle that hinders the movement of the scanning drone 60 on the basis of data or signals from the sensor group 62. For example, the obstacle corresponds to a building or the like that blocks the moving route of the scanning plan information of the scanning drone 60.

The mobile body information calculation unit 66 calculates the state of the scanning drone 60 on the basis of the data or signals from the sensor group 62. For example, the self-position and the airframe posture of the scanning drone 60 are calculated as the mobile body information. In addition, the speed, acceleration, presence or absence and contents of an abnormality of the scanning drone 60, the other states of the devices mounted on the scanning drone 60, and the like are calculated.

The image data recording unit 67 records image data captured by the camera 63. In this embodiment, the latitude and longitude, the altitude, and the airframe posture at each time of the scanning drone 60, which are supplied from the mobile body information calculation unit 66, are recorded to be linked to the image data. Further, the image data recording unit 67 transmits the image data to the server apparatus 80 via the communication control unit 70. Note that the timing at which the image data is transmitted is not limited. For example, the image data may be transmitted in real time at the time when the image data is acquired, or may be transmitted collectively after the scanning is completed.

The action planning unit 68 makes an action plan of the scanning drone 60 for scanning on the basis of information supplied from the cost map generation unit 69 and the communication control unit 70. For example, the action planning unit 68 performs planning such as settings relating to starting, stopping, traveling direction (e.g., forward, backward, left, right, or change of direction), moving speed, and imaging. The action plan also includes scanning plan information. In other words, the action plan includes autonomous flight, such as avoidance of obstacles, of the scanning drone 60, and movement and imaging to perform scanning within a predetermined region.

More specifically, the action planning unit 68 makes an action plan on the basis of the scanning range, the imaging density, the imaging interval, the cost map, and the like instructed by the user 31. For example, when the time of the scanning is set long with respect to the volume (area) of the scanning range, the scanning interval of the scanning drone 60 within the scanning range becomes dense.

In this embodiment, the scanning range includes at least one of the shape information such as a rectangular parallelepiped or a sphere, the position information such as latitude, longitude, and altitude, or the scale information such as volume and area.

For example, when the scanning range is set to be spherical, the scanning range having a predetermined radius around the position of the center of gravity of the spherical shape is defined.

Note that the setting of the scanning range is not limited. For example, the center of gravity, the rotation angle, or the like according to the shape of the scanning range may be set. In this embodiment, the action plan includes the scanning range, the settings relating to scanning, and a moving route.

Note that a specific algorithm or the like for generating the action plan is not limited. For example, the action plan may be generated by an A* algorithm (A star search algorithm) of dividing an environment into grids and optimizing the arrival determination and the weight of the route to generate the best path, the Dijkstra's algorithm (Dijkstra method) of obtaining the shortest route between two vertices on a graph, a rapidly-exploring random tree (RRT) algorithm of extending the path from the self-location to the incrementally reachable location while appropriately pruning the path, or the like.

The cost map generation unit 69 generates a cost map on the basis of the information from the obstacle detection unit 65 and the mobile body information calculation unit 66. In this embodiment, a cost map is generated on the basis of information of an obstacle or the like that blocks the route of the scanning drone 60, and the self-position and posture of the scanning drone 60.

The communication control unit 70 communicates with a communication control unit 90 that allows communication with the server apparatus 80. Note that the method of communicably connecting the communication control units 70 (90) to each other is not limited. For example, any network such as a WAN or LAN is used. The communication control unit 70 (90) is capable of transmitting and receiving various types of information (data) by controlling the communication device such as a module for establishing communication or a router.

The server apparatus 80 includes a GUI generation unit 81 and a scanning plan information unit 82. The GUI generation unit 81 includes a map data acquisition unit 83, a map image generation unit 84, a scanning range setting unit 86, an instruction information acquisition unit 85, a scanning time prediction unit 87, an image data holding unit 88, an image data transmission unit 89, and the communication control unit 90. The scanning plan information unit 82 includes a scanning plan generation unit 91 and a scanning plan holding unit 92.

Note that the map data acquisition unit 83, the map image generation unit 84, and the image data transmission unit 89 have the same functions as those of the first embodiment. Further, the communication control unit 90 has the same function as that of the communication control unit 70. The server apparatus 80 includes the map data DB 24 of the server apparatus 10.

As shown in FIG. 7, the scanning plan generating GUI 130 includes the map display part 111 of the plan generating GUI 110, a scanning range display part 132, a scanning time display part 133, a scanning setting display part 134, and a scanning execution part 135.

The instruction information acquisition unit 85 shown in FIG. 6 outputs instruction information relating to the scanning range of the scanning drone 60 to the scanning range setting unit 86. In other words, the scanning plan information of the scanning drone 60 is generated on the basis of the instruction information relating to the scanning range.

The scanning range setting unit 86 sets the scanning range of the scanning drone 60 on the basis of the instruction information relating to the scanning range. In this embodiment, the volume (area), shape, and the like of a scanning range 136 can be set. For example, the user 31 can set the scanning range 136 to a variety of shapes such as a hexagon, a circle, and a square. In this embodiment, the scanning range 136 may also be determined as a linear shape in addition to the scanning range 136 determined as a region.

The image data of the scanning range set by the scanning range setting unit 86 is transmitted to the user terminal 30 by the image data transmission unit 89. As a result, the scanning range 136 is displayed in the scanning range display part 132 of the scanning plan generating GUI 130.

Note that the method of determining the scanning range 136 is not limited. For example, a predetermined shape displayed in an area selection display part 137 may be selected, or the user 31 may freely determine the scanning range 136. Further, a scanning range 136 having a predetermined radius about the landmark may be determined, for example, when a particular landmark is selected.

Note that in this embodiment the instruction information acquisition unit 85 and the scanning range setting unit 86 correspond to a scanning generation unit that generates scanning plan information relating to scanning and imaging of the scanning mobile body within a predetermined region.

The instruction information acquisition unit 85 shown in FIG. 6 acquires the instruction information relating to the scanning range and outputs the instruction information to the scanning time prediction unit 87.

The scanning time prediction unit 87 predicts the time actually taken for scanning on the basis of the instruction information relating to the scanning range. Typically, a necessary time is determined on the basis of the size of the scanning range 136, the speed at which the scanning drone 60 moves, and the like. Of course, the necessary time may be predetermined, and the settings for scanning may be determined on the basis of the necessary time.

The image data of the time actually taken for the scanning predicted by the scanning time prediction unit 87 is transmitted to the user terminal 30 by the image data transmission unit 89. As a result, the time actually taken for scanning is displayed in the scanning time display part 133 of the scanning plan generating GUI 130.

The scanning setting display part 134 is a GUI for setting scanning. In this embodiment, according to the instruction of the user 31, it is possible to set the imaging density of the camera 63 of the scanning drone 60, the time and the route for scanning of the scanning drone 60, and the like.

For example, the imaging density indicates how much time scanning is performed on the volume (area) of the scanning range 136. In other words, (the volume of the scanning range 136)/(the time to scan)=the imaging density. Further, for example, the imaging density indicates whether or not imaging is performed in accordance with the distance traveled by the scanning drone 60. For example, the following setting may be made: the scanning drone 60 performs imaging once every three meters.

The image data holding unit 88 holds the image data transmitted from the image data recording unit 67 via the communication control unit 90. The held image data is acquired by an image data acquisition unit (not shown), and is generated as a predicted image by a predicted-image generation unit (not shown).

In this embodiment, the omnidirectional image acquired by the camera 63 is held. Thus, the predicted-image generation unit cuts off a portion corresponding to the field angle of the camera 63 from the image data on the basis of the imaging direction of the camera 63 and the airframe posture of the scanning drone 60. Lens curvature (distortion) correction is performed on the cut image data, and thus a predicted image is generated.

The scanning plan generation unit 91 shown in FIG. 6 generates scanning plan information in accordance with the selection of the scanning execution unit 135. The generated scanning plan information is held by the scan plan holding unit 92 and stored in the database 5. Note that the number of pieces of scanning plan information to be held, a saving period, and the like are not limited.

Figure 8:
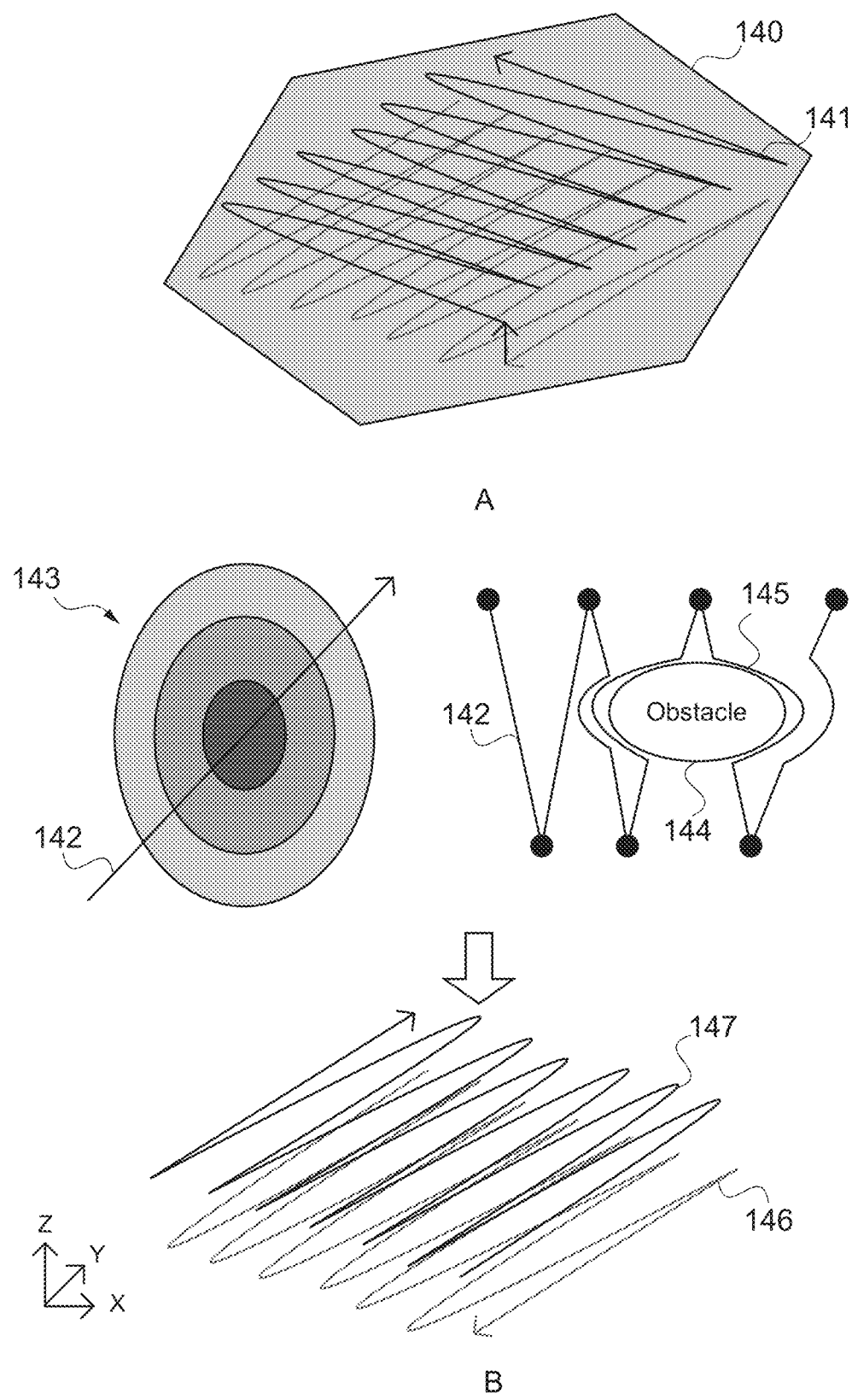
FIG. 8 is a schematic diagram showing a specific example of the scanning of the scanning drone.

FIG. 8 is a schematic diagram showing a specific example of the scanning of the scanning drone 60. FIG. 8A is a schematic diagram showing an exemplary moving route scanned by the scanning drone 60. FIG. 8B is a schematic diagram showing an exemplary method of calculating a moving route of the scanning drone 60.

As shown in FIG. 8A, a scanning range 140 is determined by an instruction from the user 31. At this time, a moving route 141 for performing scanning by the scanning drone 60 is determined on the basis of the setting of the imaging density or the like determined by the user 31.

As shown in FIG. 8A, when there is no obstacle within the scanning range 140, the action planning unit 68 plans the moving route 141 such that the image data within the scanning range 140 can be sufficiently acquired. For example, the moving route 141 is set to be wavy on the surface of the scanning range 140 having a constant altitude. Further, after the surface of the scanning range 140 is scanned, the moving route 141 is set so as to change the altitude by a certain distance and further perform scanning in a wavy manner.

For example, when the height of the scanning range 140 is set to 50 m, the moving route 141 may be set for each height of 10 m. In other words, the scanning drone 60 scans the scanning range 140 five times at different heights.

Note that the method of setting the moving route 141 is not limited. For example, the interval of the moving route may be set on the basis of the performance such as the imaging range of the camera 63 of the scanning drone 60. Further, for example, the user 31 may determine predetermined positions within the scanning range, and the moving route 141 may be set so as to connect such positions.

As shown in FIG. 8B, the cost map generation unit 69 generates a cost map 143 for the moving route 142 on which the scanning drone 60 has moved. In this embodiment, the cost around the route through which the scanning drone 60 has passed once is set high by the cost map generation unit 69. For example, as the radius becomes shorter in a circle around the moving route 142, the cost is set higher. In other words, the cost map generation unit 69 generates a three-dimensional cylindrical cost map 143 around the route through which the scanning drone 60 has passed. Not that in this embodiment the cost map 143 corresponds to cost information relating to a scanning route.

In addition, when an obstacle 144 is present on the moving route 142 by the obstacle detection unit 65, the cost map generation unit 69 sets the cost around the obstacle 144 to be high. In other words, a moving route 145 is generated such that the scanning drone 60 avoids the obstacle 144.

The action planning unit 68 generates the next moving route 147 of the scanning drone 60 on the basis of the cost map generated by the cost map generation unit 69 such that the cost is reduced. In other words, in this embodiment, the moving route 147 is generated so as not to overlap a moving route 146 having a different height (Z-axis) when viewed from the height direction (Z-axis direction).

Note that the method of generating the cost map is not limited. For example, the cost map may be generated by a route search algorithm such as an A star search algorithm or the Dijkstra method. Any machine learning algorithm may also be used. Further, the cost map generated once may be updated at any time.

This makes it possible to uniformly scan the scanning range of the three-dimensional space by increasing the cost of the route that has been taken before. In this embodiment, the moving route 145 corresponds to a scanning route that has been taken in the past.

As described above, in the server apparatus 10 according to this embodiment, the image data relating to a region on a map desired to be imaged is acquired. The predicted image 124, which is predicted to be acquired when imaging is performed within a region desired to be imaged, is generated on the basis of the image data. The predicted image 124 is presented on the basis of an instruction relating to the generation of scenario plan information relating to movement and imaging of a drone 50 having an imaging function within a region desired to be imaged. Thus, it is possible to generate high-quality plan information for the movement and imaging of the mobile body having an imaging function.

In the case of imaging using a drone, it is difficult to imagine in advance what field angle and flow a video to be captured will have, even if a moving route is designated in advance. So, imaging performed using a drone strongly depends on manual scanning by a human.

For example, imaging is performed in a system of two persons having a role of operating a camera of a drone and a role of operating the drone. Further, when the camera and the drone are operated by one person, the operation is difficult and a video cannot be taken well.

On the other hand, the autonomous flight technology for a drone that automatically flies along a route designated in advance by a user is becoming easier.

So, in this technology, at the stage of generating a moving route, the moving route and the direction of the camera are designated while confirming the image data predicted to be imaged from the moving route and the direction of the camera in each moving route, so that imaging by autonomous flight is achieved.

This makes it possible to easily capture a video desired to be captured even without the sophisticated operation technology of the drone. Further, it is possible to reduce the number of times of trial and error in imaging, and to reduce the cost.

Second Embodiment

A drone imaging system 200 according to a second embodiment of the present technology will be described. In the following description, descriptions of a configuration and an operation similar to those of the drone imaging system 100 described in the above embodiment are omitted or simplified.

In the first embodiment, the predicted image of the transit point 121 selected by the user is displayed when the scenario plan information is generated. In the second embodiment, the user selects a landmark displayed in the map display part, and thus the predicted image can be displayed.

Figure 9:
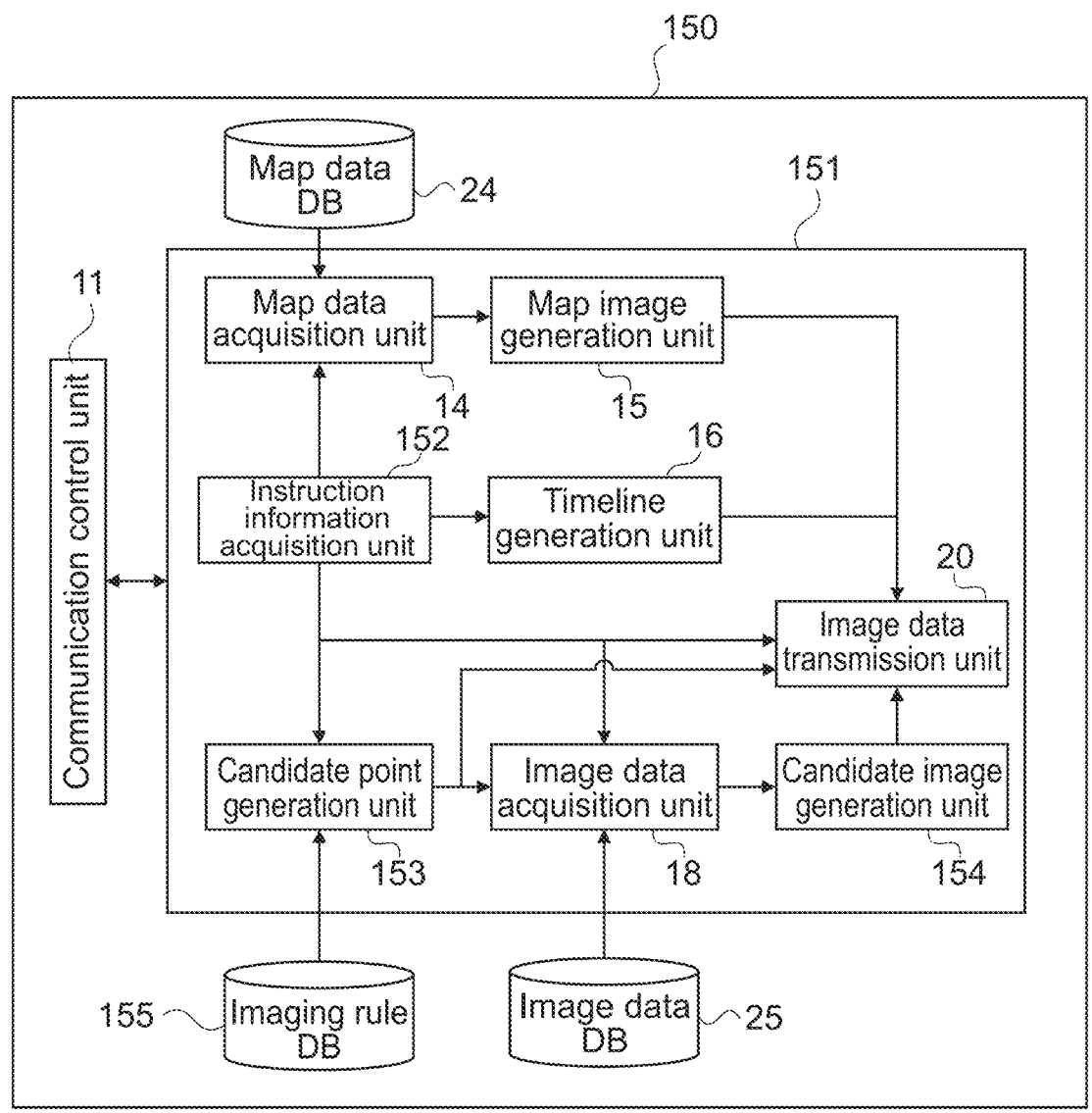
FIG. 9 is a block diagram showing a functional configuration example of a server apparatus according to a second embodiment.

FIG. 9 is a block diagram showing a functional configuration example of a server apparatus 150 according to the second embodiment of the present technology. A GUI generation unit 151 of the server apparatus 150 includes a candidate point generation unit 153 and a candidate image generation unit 154 in addition to the GUI generation unit 12 of the server apparatus 10.

Further, in the server apparatus 150, an imaging rule DB 155 is added as an example of the database 5 in addition to the map data DB 24 and the image data DB 25. Note that a scenario plan information generation unit is similar to the scenario plan information generation unit 13 of the first embodiment, and thus the illustration thereof is omitted.

Figure 10:
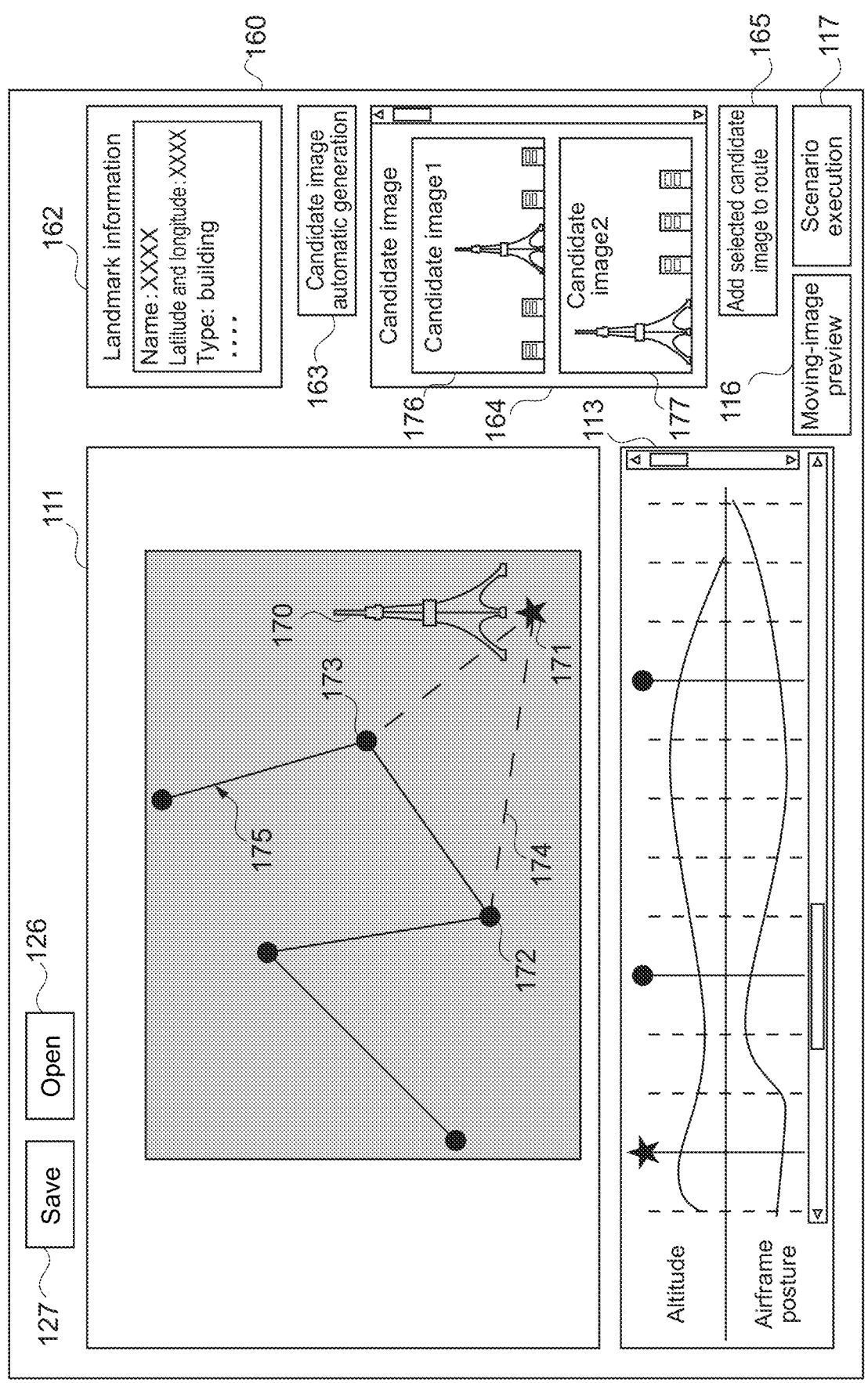
FIG. 10 is a schematic diagram showing an example of a plan generating GUI when a candidate image is used.

FIG. 10 is a schematic diagram showing an example of a plan generating GUI 160 when a candidate image is used. As shown in FIG. 10, the plan generating GUI 160 includes the map display part 111, the timeline display part 113, the moving-image preview button 116, the scenario execution button 117, the open button 126, and the save button 127 of the plan generating GUI 110. In addition to those above, the plan generating GUI 160 includes a landmark information display part 162, a candidate image generation part 163, a candidate image display part 164, and a candidate image addition part 165.

Figure 11:
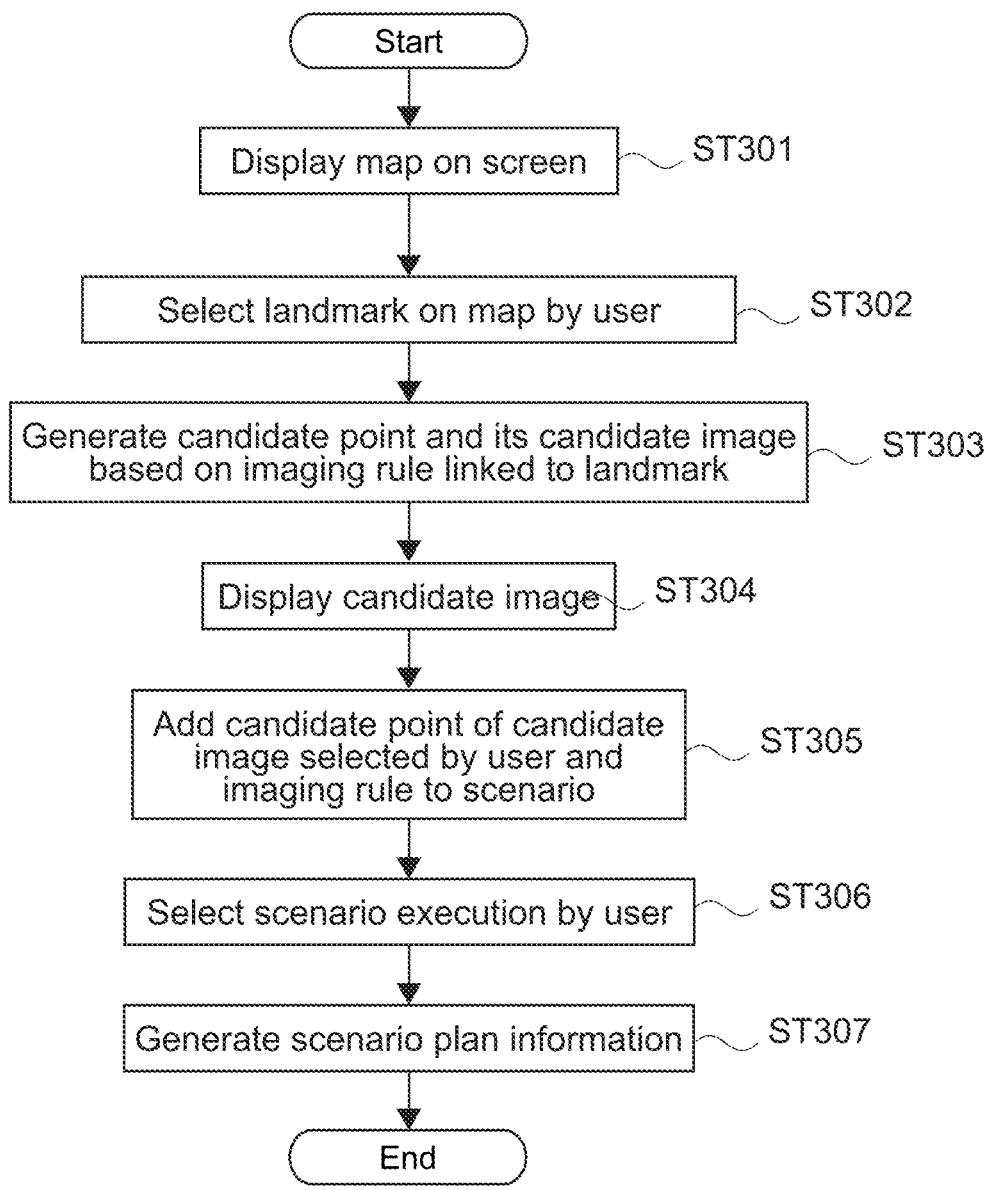
FIG. 11 is a flowchart showing a specific example of processing for generating scenario plan information using a candidate image.

FIG. 11 is a flowchart showing a specific example of processing for generating scenario plan information using a candidate image. The processing of Step 301, Step 306, and Step 307 are the same as in the first embodiment, and thus description thereof is omitted.

As shown in FIG. 10, the user selects a particular landmark on the map displayed in the map display part 111 (Step 302). Information of the selected landmark is displayed in the landmark information display part 162. Note that in the second embodiment a schematic diagram 170 representing the selected landmark is displayed in the map display part 111. For example, when the user selects the Tokyo Tower as a landmark, the schematic diagram 170 is displayed in a diagram simulating the Tokyo Tower in the vicinity of the selected transit point 171 (asterisk).

The instruction information acquisition unit 152 shown in FIG. 9 acquires instruction information relating to the selection of the transit point 171, and outputs the instruction information to the candidate point generation unit 153.

The candidate point generation unit 153 generates a candidate point of the landmark selected by the user on the basis of the imaging rules held in the imaging rule DB 155.

The candidate point indicates the position information set for each landmark selected by the user. For example, position information such as a position 30 m away from the Tokyo Tower in the directions of north, south, east, and west is set for each landmark.

Note that in this embodiment the candidate point indicates at least one of a relative imaging position of the drone 50 set for each classification of the landmark serving as a selection target or a display state of the landmark in the acquired image.

The landmark information display part 162 displays information regarding the landmark held in the imaging rule DB 155. For example, the name of the landmark selected by the user, the latitude and longitude, the type of the building, and the like are displayed. The present technology is not limited to the above, and a height or the like may be displayed as long as it is a mountain or a building.

The candidate image automatic generation button 163 is a button for generating a candidate image of a landmark that the user makes a selection target. In this embodiment, landmark candidate images 176 and 177 and the like are generated on the basis of the imaging rules set for the selected landmark (Step 303).

Note that in this embodiment the candidate image corresponds to a prediction candidate image generated on the basis of the position information of the object serving as the selection target.

The candidate image generation unit 154 generates a candidate image when imaging is performed by the drone 50 on the basis of the generated candidate point.

The candidate image generation unit 154 generates image data of the candidate image. The image data of the candidate image generated by the candidate image generation unit 154 is transmitted to the user terminal 30 by the image data transmission unit 20. Thus, the candidate images 176 and 177 are displayed in the candidate image display part 164 of the plan generating GUI 160 (Step 304).

In this embodiment, the user can select the generated candidate images 176 and 177 on the basis of the imaging rules. The user can also select another candidate image by scrolling the candidate image display part 164 downward.

In the imaging rule DB 155, the imaging rules relating to imaging of various landmarks are held. An example of the imaging rules will be described with reference to FIG. 12.

The candidate image addition button 165 is a button for adding the candidate image of the landmark selected by the user to the moving route. In other words, the position of the transit point 171 linked to the candidate image selected by the user and the imaging rules are added to the scenario plan information (Step 305).

For example, as shown in FIG. 10, when the candidate image addition part 165 is selected by the user, broken lines 174 connecting the transit point 171 and the transit points 172 and 173 are displayed in the map display part 111. In other words, a moving route (broken lines 174 and solid line 175) that passes through the transit point 171 is generated as scenario plan information of the drone 50.

In other words, a plurality of candidate images displayed in the candidate image display part 164 can also be referred to as predicted images. Further, the position of the transit point linked to the candidate image and the imaging rules can also be referred to as plan information regarding the movement and imaging within a predetermined region on the map, which is specified after the generation of the predicted image. A candidate moving image generated by selecting the moving-image preview button 116 is also similar.

FIG. 12 is a diagram showing an example of the imaging rules. In this embodiment, the landmark type, the distance from the target, the imaging azimuth, the imaging altitude, and the field angle position are set as the imaging rules.

The landmark type indicates the classification of the landmark. For example, high-rise buildings, mountains, bridges, houses, and the like are set. Of course, other landmark classifications may be set. Note that in this embodiment the landmark type corresponds to classification information for classifying an object.

The distance from the target indicates the distance between the selected landmark and the drone 50. For example, if "distance 0" is set, a distance (position) from which imaging can be performed directly above or directly below a building serving as an object is a candidate point. Further, if "40%" is set, a distance from which imaging can be performed such that the object occupies 40% of the total height of the field angle of the camera of the drone 50 is a candidate point.

Further, for example, if the distance from the target is set to "140%", the landmark is enlarged by 1.4 times and displayed from the state in which the landmark occupies 100% of the total height of the field angle of the camera. In other words, the drone 50 performs imaging at a position closer to the landmark than when the distance from the target is "100%".

In other words, the distance from the target is defined as the distance at which an image is captured, in which the landmark occupies a certain amount with respect to the total height of the field angle of the camera.

The imaging azimuth indicates the direction in which the drone 50 images a target landmark. In this embodiment, north, south, east, west, and directly above are set for the landmark. The imaging altitude indicates the position with respect to the height of the object. For example, if "50%" is set, the position of 50% of the height of the building is a candidate point. Note that in this embodiment the distance from the object and the imaging altitude correspond to the imaging position relative to the object.

The field angle position indicates the position where the object appears in the image captured by the drone 50. For example, a position or a direction of the camera, from which the building can be displayed at the center, is a candidate point.

A plurality of candidate points is generated by a combination of those various imaging rules. For example, a candidate point in the case where the building is imaged from directly above at the center of the image is generated according to the imaging rules set as follows: the landmark type is "building", the distance from the target is "distance 0 (directly above)", the imaging azimuth is "directly above", the imaging altitude is "120%", and the field angle position is "center". In other words, the imaging rules can be said to be imaging conditions of a candidate point. Note that in this embodiment the imaging azimuth and the field angle position correspond to the display state of the object in the predicted image.

The conditions of the imaging rules are not limited. For example, any imaging rule may be set by the user. Note that in this embodiment the distance from the object, the imaging azimuth, the imaging altitude, and the field angle position correspond to the relative position between the object and the mobile body. Note that in this embodiment the imaging rules correspond to rules for generating a predicted image relating to an instruction to select an object.

As a result, when the scenario plan information is generated, the scenario plan information such as the latitude and longitude, the altitude, and the direction of the camera of the drone 50 can be set by selecting the candidate point, so that the scenario plan information can be easily generated.

Third Embodiment

A drone imaging system 300 according to a third embodiment of the present technology will be described.

In the second embodiment, the candidate images of the plurality of candidate points corresponding to the selected landmark for each imaging rule are displayed in the candidate image display part 164. In the third embodiment, only one of the plurality of candidate points is randomly selected, and a candidate image of the selected candidate point is generated. A candidate image is selected by image recognition as to whether a landmark is present in the generated candidate image.

Figure 13:
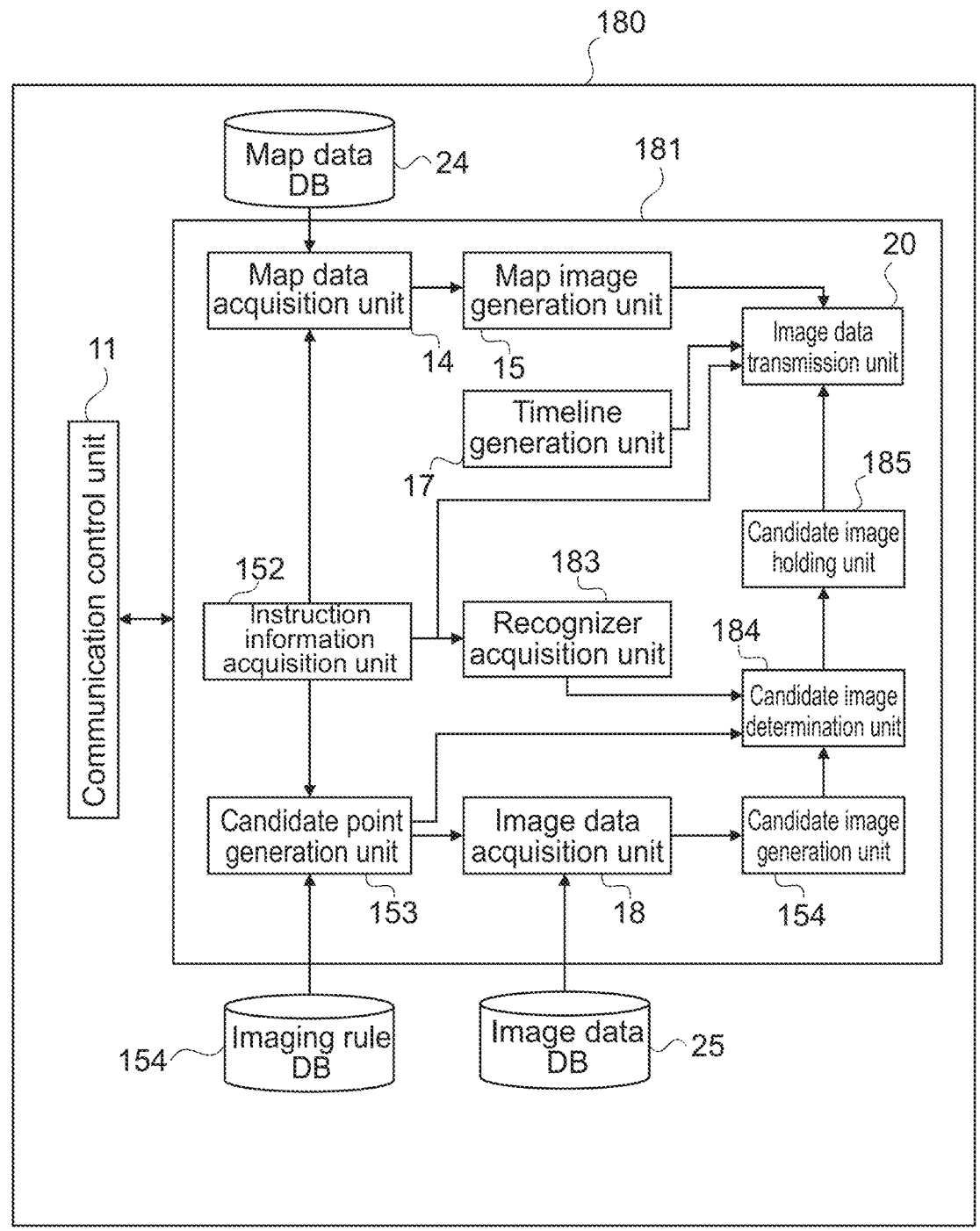
FIG. 13 is a block diagram showing a functional configuration example of a server apparatus according to a third embodiment.

FIG. 13 is a block diagram showing a functional configuration example of a server apparatus 180 according to the third embodiment of the present technology. The server apparatus 180 includes a GUI generation unit 181 and a scenario plan information generation unit 182. The GUI generation unit 181 includes a recognizer acquisition unit 183, a candidate image determination unit 184, and a candidate image holding unit 185 in addition to the server apparatus 150 of the second embodiment. Note that the scenario plan information generation unit 182 is similar to that of the first embodiment, and thus the illustration thereof is omitted.

Similar to the second embodiment, the instruction information acquisition unit 152 acquires instruction information relating to the selection of the transit point 171, and outputs the instruction information to the candidate point generation unit 153.

The candidate point generation unit 153 generates a candidate point on the basis of an instruction from the user and imaging rules held in the imaging rule DB 155. In the third embodiment, only one candidate point is selected, and a candidate image of the selected candidate point is generated.

The recognizer acquisition unit 183 acquires a recognizer for performing image recognition on the predicted image generated by the candidate image generation unit 154. For example, a recognizer corresponding to various uses such as a determination in which the candidate image is a scene or a building or an inspection of a deterioration state of the building is acquired. Further, the instruction information acquisition unit 152 may acquire instruction information relating to the acquisition of the recognizer, and output the instruction information to the recognizer acquisition unit 183.

The candidate image determination unit 184 determines whether or not the selected landmark is present in the generated candidate image. In this embodiment, the candidate image determination unit 184 determines whether or not the reliability of the landmark in the candidate image exceeds a predetermined threshold value. In other words, the recognizer is used to evaluate (score) whether or not the candidate image is an image according to the purpose.

Note that a specific algorithm or the like for performing image recognition is not limited, and, for example, machine learning may be used. For example, a template image indicating a landmark and a landmark appearing in a candidate image may be determined by template matching. Further, for example, the accuracy of the candidate image may be improved by matching using feature points or the like in an image of a high-accuracy landmark captured by a professional photographer.

The candidate image holding unit 185 holds a candidate image whose reliability is determined to exceed a predetermined threshold value by the candidate image determination unit 184. In this embodiment, the candidate image holding unit 185 keeps holding the candidate images until the number of candidate images whose reliability exceeds a predetermined threshold value reaches a predetermined number. When the number of candidate images reaches a predetermined number, the supplied candidate images are displayed in the candidate image display part 164.

In other words, the predicted image is generated by generating a prediction candidate image on the basis of the position information of the object serving as the selection target, and evaluating the prediction candidate image relating to the display state of the object in the predicted image.

Figure 14:
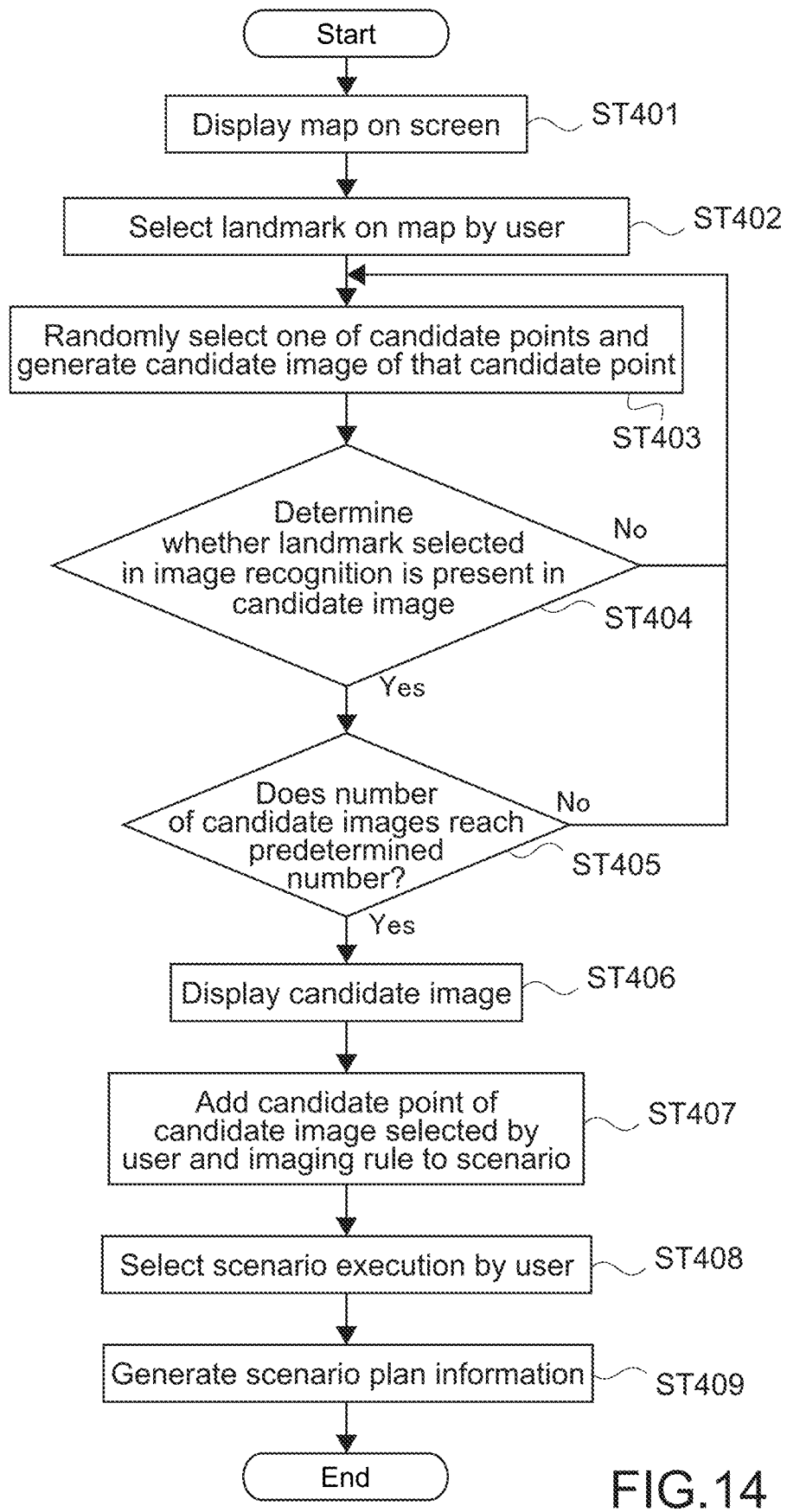
FIG. 14 is a flowchart showing a determination example for generating a candidate image.

FIG. 14 is a flowchart showing a determination example for generating a candidate image. The processing of Step 401, Step 402, Step 406, Step 407, Step 408, and Step 409 are the same as in the first embodiment, and thus description thereof is omitted.

With reference to FIG. 10, a landmark displayed in the map display part 111 is selected by the user. One of a plurality of candidate points is randomly selected on the basis of the imaging rules linked to the landmark by the candidate point generation unit 153, and a candidate image of the candidate point is generated (Step 403).

For example, if the type of the landmark selected by the user is mountain, a candidate image is generated, which is captured from 10% of the height of the mountain from the west and is displayed such that the mountain occupies 60% of the height of the field angle at the center of the field angle.

The candidate image determination unit 184 determines whether or not the selected landmark is present in the generated candidate image (Step 404). For example, if the Tokyo tower is selected as a landmark by the user, the candidate image determination unit 184 performs image recognition on the generated candidate image to determine whether the Tokyo tower is present in the candidate image.

If it is determined that the selected landmark is present in the candidate image (Yes in Step 404), the candidate image holding unit 185 holds that candidate image. If the number of candidate images reaches a predetermined number (Yes in Step 405), the candidate image held by the candidate image holding unit 185 is displayed in the candidate image display part 164 (Step 406).

If it is determined that the selected landmark is not present in the candidate image (No in Step 404) or if the number of candidate images does not reach a prescribed number (No in Step 405), a candidate point of the landmark selected by the candidate point generation unit 153 is generated, and a candidate image of the candidate point generated by the candidate image generation unit 154 is newly generated.

Thus, it is possible to make the predicted image, which is displayed using the evaluation result by the image recognizer, highly accurate.

Other Embodiments

The present technology is not limited to the embodiments described above and can provide various other embodiments.

FIG. 15 is a block diagram showing a hardware configuration example of the server apparatus 10. Of course, the hardware configuration example of the server apparatus 10 can be similarly implemented for the server apparatuses 80, 150, and 180.

The server apparatus 10 includes a CPU 201, a read only memory (ROM) 202, a RAM 203, an input/output interface 205, and a bus 204 that connects them to each other. A display unit 206, an input unit 207, a storage unit 208, a communication unit 209, a drive unit 210, and the like are connected to the input/output interface 205.

The display unit 206 is a display device using liquid crystal, electro-luminescence (EL), or the like. The input unit 207 is, for example, a keyboard, a pointing device, a touch panel, or other operation devices. In a case where the input unit 207 includes a touch panel, the touch panel may be integrated with the display unit 206.

The storage unit 208 is a nonvolatile storage device and is, for example, an HDD, a flash memory, or other solid-state memory. The drive unit 210 is, for example, a device capable of driving a removable recording medium 211 such as an optical recording medium or a magnetic recording tape.

The communication unit 209 is a modem, a router, or other communication device that can be connected to a LAN, a WAN, or the like for communicating with other devices. The communication unit 209 may communicate using either wired or wireless communication. The communication unit 209 is often used separately from the server apparatus 10.

In this embodiment, the communication unit 209 allows communication with other devices via the network.

The information processing by the server apparatus 10 having the above-mentioned hardware configuration is implemented in cooperation with the software stored in the storage unit 208, the ROM 202, or the like and the hardware resources of the server apparatus 10. Specifically, the information processing method according to the present technology is implemented when a program stored in the ROM 202 or the like and configuring the software is loaded into the RAM 203 and then executed.

The program is installed in the server apparatus 10, for example, through the recording medium 211. Alternatively, the program may be installed in the server apparatus 10 via a global network or the like. Moreover, any non-transitory computer-readable storage medium may be used.

In the third embodiment described above, the scanning plan information of the scanning drone 60 is generated, and thus the scanning drone 60 autonomously flies and the image data is acquired. The present technology is not limited to the above, and image data may be acquired by the user operating the scanning drone 60.

In the first embodiment and the second embodiment described above, the imaging conditions are displayed in the timeline in the timeline display part 113. The present technology is not limited to the above, and the imaging conditions such as the altitude, the airframe posture, and the camera direction displayed in the timeline display part 113 may be controlled by the selection of the user. For example, the user may select a timeline indicating the altitude of the drone 50 at the transit point and drag the timeline, so that the altitude may be controlled.

In the first embodiment and the second embodiment described above, the "distance from the target" of the imaging rules linked to the landmark is defined as a distance at which an image is captured, in which the landmark occupies a certain amount with respect to the total height of the field angle of the camera. The present technology is not limited to the above, and it may be defined as a distance at which an image is captured, in which the landmark occupies a certain amount with respect to the horizontal length perpendicular to the height direction of the field angle of the camera. In addition, the distance from the target also includes a case where the candidate image is a photograph or the like captured as looking upward and the lower end and the upper end thereof are not captured.

In the first embodiment, the second embodiment, and the third embodiment described above, the server apparatus provides the drone imaging system to the user terminal 30 via the network 35. The present technology is not limited to the above, and the configuration that functions as the server apparatus may be included in the user terminal 30 or the drone 50.

In the first embodiment, the second embodiment, and the third embodiment described above, the drone 50 and the scanning drone 60 execute the scenario plan information and the scanning plan information by one autonomous flight. The present technology is not limited to the above. For example, if it is determined that a battery or the like does not last until the scenario plan information and the scanning plan information are ended, information of to which point the image has been captured may be held. Alternatively, the autonomous flight may be continued from a position in the middle of imaging after the battery is replaced or charged by RTH (Return To Home) or the like. Further, the drone 50 and the scanning drone 60 may have a moving mechanism that is movable over the ground or water as well as in aerial flight.

In the first embodiment, the second embodiment, and the third embodiment described above, the plan generating GUI is presented as an application. The present technology is not limited to toe above. For example, a web site relating to the drone development system may be constructed, and a predetermined web page within the web site may be accessed through the user terminal 30, so that the plan generating GUI may be presented.

The information processing apparatus, the information processing method, the program, and the information processing system according to the present technology may be performed, and the information processing apparatus according to the present technology may be constructed, by linking a computer mounted on a communication terminal with another computer capable of communicating via a network or the like.

In other words, the information processing apparatus, the information processing method, the program, and the information processing system according to the present technology can be performed not only in a computer system formed of a single computer, but also in a computer system in which a plurality of computers operates cooperatively. Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the information processing apparatus, the information processing method, the program, and the information processing system according to the present technology by the computer system includes, for example, both a case in which the generation of the scenario plan information, the acquisition of image data, the generation of the predicted image, and the like are performed by a single computer; and a case in which the respective processes are performed by different computers. Further, the execution of each process by a predetermined computer includes causing another computer to perform a portion of or all of the process and obtaining a result thereof.

In other words, the information processing apparatus, the information processing method, the program, and the information processing system according to the present technology are also applicable to a configuration of cloud computing in which a single function is shared and cooperatively processed by a plurality of apparatuses through a network.

The respective configurations of the GUI generation unit, the image data acquisition unit, the predicted-image generation unit, the plan generation unit, and the like; the control flow of the communication system; and the like described with reference to the respective figures are merely embodiments, and any modifications may be made thereto without departing from the spirit of the present technology. In other words, for example, any other configurations or algorithms for purpose of practicing the present technology may be adopted.

Note that the effects described in the present disclosure are merely illustrative and not restrictive, and other effects may be obtained. The above description of the plurality of effects does not necessarily mean that these effects are simultaneously exhibited. It means that at least one of the above-mentioned effects can be obtained depending on the conditions and the like, and of course, there is a possibility that an effect not described in the present disclosure can be exhibited.

At least two of the features among the features of the embodiments described above can also be combined. In other words, various features described in the respective embodiments may be combined discretionarily regardless of the embodiments.

Note that the present technology may also take the following configurations.

(1) An information processing apparatus, including:
an acquisition unit that acquires image data relating to a predetermined region on a map;
an image generation unit that generates a predicted image on the basis of the image data, the predicted image being predicted to be acquired when imaging is performed within the predetermined region; and
a presentation unit that presents the predicted image on the basis of an instruction relating to generation of plan information relating to movement and imaging of a mobile body having an imaging function within the predetermined region.

(2) The information processing apparatus according to (1), in which
the presentation unit outputs a graphical user interface (GUI) including the predicted image for inputting the instruction relating to the generation of the plan information.

(3) The information processing apparatus according to (1) or (2), in which
the image generation unit generates the predicted image on the basis of an instruction relating to at least one of a position within the predetermined region or an imaging condition.

(4) The information processing apparatus according to (3), in which
the imaging condition includes at least one of an imaging direction, an imaging time, or environment information relating to the predetermined region.

(5) The information processing apparatus according to any one of (1) to (4), in which
the image generation unit generates, on the basis of an instruction to select an object present within the predetermined region, the predicted image in which the object is imaged.

(6) The information processing apparatus according to (5), in which
the image generation unit generates the predicted image on the basis of a generation rule of the predicted image relating to the instruction to select the object.

(7) The information processing apparatus according to (6), in which
the generation rule includes classification information for classifying the object and at least one of information of a relative imaging position relative to the object or information of a display state of the object within the predicted image, as information associated with the classification information.

(8) The information processing apparatus according to any one of (5) to (7), in which
the image generation unit generates the predicted image by generating a prediction candidate image on the basis of position information of the object serving as a selection target and evaluating the prediction candidate image regarding a display state of the object within the predicted image.

(9) The information processing apparatus according to any one of (1) to (8), further including
a plan generation unit that generates the plan information on the basis of an input instruction relating to the generation of the plan information.

(10) The information processing apparatus according to (9), in which
the plan generation unit generates the plan information on the basis of an instruction to select the presented predicted image.

(11) The information processing apparatus according to any one of (1) to (10), in which
the plan information includes at least one of a transit point, a moving time, or an imaging condition.

(12) The information processing apparatus according to any one of (1) to (11), in which
the image data is image data acquired when a scanning mobile body having an imaging function performs imaging while scanning the predetermined region.

(13) The information processing apparatus according to any one of (1) to (12), in which
the image data includes omnidirectional image data.

(14) The information processing apparatus according to any one of (1) to (13), further including
a control unit that controls an operation relating to the movement and the imaging of the mobile body having the imaging function on the basis of the plan information.

(15) The information processing apparatus according to (12), further including
a scanning generation unit that generates scanning plan information relating to scanning and imaging of the scanning mobile body within the predetermined region.

(16) The information processing apparatus according to (15), in which
the scanning plan information includes cost information relating to a scanning route, and
the cost information is generated on the basis of a scanning route that has been taken in a past.

(17) An information processing method, which is executed by a computer system, the method including:
acquiring image data relating to a predetermined region on a map;
generating a predicted image on the basis of the image data, the predicted image being predicted to be acquired when imaging is performed within the predetermined region; and
presenting the predicted image on the basis of an instruction relating to generation of plan information relating to movement and imaging of a mobile body having an imaging function within the predetermined region.

(18) A program causing a computer system to execute the steps of:
acquiring image data relating to a predetermined region on a map;
generating a predicted image on the basis of the image data, the predicted image being predicted to be acquired when imaging is performed within the predetermined region; and
presenting the predicted image on the basis of an instruction relating to generation of plan information relating to movement and imaging of a mobile body having an imaging function within the predetermined region.

(19) An information processing system, including:
an information processing apparatus including
an acquisition unit that acquires image data relating to a predetermined region on a map,
an image generation unit that generates a predicted image on the basis of the image data, the predicted image being predicted to be acquired when imaging is performed within the predetermined region,
a presentation unit that presents the predicted image on the basis of an instruction relating to generation of plan information relating to movement and imaging of a mobile body having an imaging function within the predetermined region, and a plan generation unit that generates the plan information on the basis of an input instruction relating to the generation of the plan information; and a mobile body that includes an imaging unit and performs imaging while moving within the predetermined region on the basis of the plan information generated by the information processing apparatus.

REFERENCE SIGNS LIST 10 server apparatus
11, 70, 90 communication control unit
12, 81, 151, 181 GUI generation unit
13 scenario plan information generation unit
18 image data acquisition unit
19 predicted-image generation unit
20 image processing unit
50 drone
51 imaging device
60 scanning drone
63 camera
68 action planning unit
69 cost map generation unit
82 scanning plan information unit
86 scanning plan setting unit
100 drone imaging system
110, 160 plan generating GUI
154 candidate image generation unit
155 imaging rule DB
184 candidate image determination unit

The invention claimed is:

1. An information processing apparatus, comprising: circuitry configured to:
    acquire image data relating to a predetermined region on a map;
    generate a predicted image on a basis of the image data, the predicted image being generated based on information of a transit point of a moving route on the map and an imaging condition for a mobile body having a camera, output the predicted image as a preview display; and
    generate scenario plan information based on the predicted image and user input information;
    wherein movement of the mobile body is controlled based on the scenario plan information; and
    wherein imaging an object within the predetermined region on the map is performed by the camera of the mobile body based on the scenario plan information.

2. The information processing apparatus according to claim 1, wherein
    the circuitry is configured to output the predicted image via a graphical user interface (GUI) for receiving the user input information for the scenario plan information.

3. The information processing apparatus according to claim 1, wherein
    the circuitry is configured to generate the predicted image on the basis of an instruction relating to at least one of a position within the predetermined region or the imaging condition.

4. The information processing apparatus according to claim 3, wherein
    the imaging condition includes at least one of an imaging direction of the camera of the mobile body, an imaging time of the camera of the mobile body, or environment information relating to the predetermined region.

5. The information processing apparatus according to claim 1, wherein
    the circuitry is configured to generate, on a basis of an instruction to select the object present within the predetermined region, the predicted image in which the object is imaged.

6. The information processing apparatus according to claim 5, wherein
    the circuitry is configured to generate the predicted image on a basis of a generation rule of the predicted image relating to the instruction to select the object.

7. The information processing apparatus according to claim 6, wherein
    the generation rule includes classification information for classifying the object and at least one of information of a relative imaging position relative to the object or information of a display state of the object within the predicted image, as information associated with the classification information.

8. The information processing apparatus according to claim 5, wherein
    the circuitry is configured to generate the predicted image by generating a prediction candidate image on a basis of position information of the object serving as a selection target and evaluating the prediction candidate image regarding a display state of the object within the predicted image.

9. The information processing apparatus according to claim 1, further comprising
    the circuitry is configured to generate the scenario plan information on a basis of an input instruction relating to the generation of the scenario plan information.

10. The information processing apparatus according to claim 9, wherein
    the circuitry is configured to generate the scenario plan information on a basis of an instruction to select the presented predicted image.

11. The information processing apparatus according to claim 1, wherein
    the scenario plan information includes at least one of the transit point, a moving time, or an imaging condition for the mobile body.

12. The information processing apparatus according to claim 1, wherein
    the image data is image data acquired when a scanning mobile body having an camera performs imaging while scanning the predetermined region.

13. The information processing apparatus according to claim 1, wherein
    the image data includes omnidirectional image data.

14. The information processing apparatus according to claim 1, wherein
    the circuitry is configured to control transmission of the scenario plan information to the mobile body so that the mobile body operates based on the scenario plan information.

15. The information processing apparatus according to claim 12, wherein
    the circuitry is configured to generate scanning plan information relating to scanning and imaging of the scanning mobile body within the predetermined region.

16. The information processing apparatus according to claim 15, wherein
    the scanning plan information includes cost information relating to a scanning route, and the cost information is generated on a basis of a scanning route that has been taken in a past.

17. An information processing method, which is executed by a computer system, the method comprising:
acquiring image data relating to a predetermined region on a map;
generating a predicted image on a basis of the image data, the predicted image being generated based on information of a transit point of a moving route on the map and an imaging condition for a mobile body having a camera;
outputting the predicted image as a preview display; and
generating scenario plan information based on the predicted image and user input information;
wherein movement of the mobile body is controlled based on the scenario plan information; and
wherein imaging an object within the predetermined region on the map is performed by the camera of the mobile body based on the scenario plan information.

18. A non-transitory computer-readable storage medium including computer executable instructions, wherein the instructions, when executed by an information processing apparatus, cause the information processing apparatus to perform a method, the method comprising:
acquiring image data relating to a predetermined region on a map;
generating a predicted image on a basis of the image data, the predicted image being generated based on information of a transit point of a moving route on the map and an imaging condition for a mobile body having a camera;
outputting the predicted image as a preview display; and
generating scenario plan information based on the predicted image and user input information;
wherein movement of the mobile body is controlled based on the scenario plan information; and
wherein imaging an object within the predetermined region on the map is performed by the camera of the mobile body based on the scenario plan information.

19. An information processing system, comprising:
an information processing apparatus; and
a mobile body having a camera, wherein the information processing apparatus including circuitry configured to:
acquire image data relating to a predetermined region on a map;
generate a predicted image on a basis of the image data, the predicted image being generated based on information of a transit point of a moving route on the map and an imaging condition for the mobile body,
output the predicted image as a preview display; and
generate scenario plan information based on the predicted image and user input information;
wherein movement of the mobile body is controlled based on the scenario plan information;
wherein imaging an object within the predetermined region on the map is performed by the camera of the mobile body based on the scenario plan information; and
wherein the mobile body performs imaging by the camera while moving within the predetermined region on a basis of the scenario plan information generated by the information processing apparatus.

* * * * *